US010861068B2

(12) United States Patent
Bursey et al.

(10) Patent No.: US 10,861,068 B2
(45) Date of Patent: *Dec. 8, 2020

(54) SYSTEMS AND METHODS TO SUPPLEMENT SEARCH RESULTS RETURNED TO A BUYER OF PARTS

(71) Applicant: eBay Inc., San Jose, CA (US)

(72) Inventors: Adam Bursey, San Jose, CA (US); Jennifer M. Dante, San Francisco, CA (US); Brian M. Johnson, Santa Clara, CA (US)

(73) Assignee: eBay Inc., San Jose, CA (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/007,763

(22) Filed: Jun. 13, 2018

(65) Prior Publication Data

US 2018/0300778 A1 Oct. 18, 2018

Related U.S. Application Data

(63) Continuation of application No. 12/579,398, filed on Oct. 14, 2009, now Pat. No. 10,037,555.

(Continued)

(51) Int. Cl.
*G06Q 30/06* (2012.01)
(52) U.S. Cl.
CPC ......... *G06Q 30/06* (2013.01); *G06Q 30/0601* (2013.01); *G06Q 30/0603* (2013.01); *G06Q 30/0605* (2013.01)
(58) Field of Classification Search
CPC .............................................. G06Q 30/00–08
See application file for complete search history.

(56) References Cited

U.S. PATENT DOCUMENTS 4,992,940 A 2/1991 Dworkin
6,097,841 A * 8/2000 Gunji ...................... G06K 9/72
382/229

(Continued)

FOREIGN PATENT DOCUMENTS

WO 2011/085257 A1 7/2011

OTHER PUBLICATIONS

Search Marketing: Optimising the search mix. Marketing Week ; London (Apr. 20, 2006): 41-42; Retrieved via ProQuest on Jul. 20, 2020 (Year: 2006).*

(Continued)

*Primary Examiner* — Michael Misiaszek
(74) *Attorney, Agent, or Firm* — Shook, Hardy & Bacon L.L.P.

(57) ABSTRACT

Methods and systems to supplement search results returned to a buyer of parts are described. The system receives a first query from a buyer. The first query includes keywords. The system identifies at least one compatibility keyword included in the keywords. The system further infers that the other keywords in the query are item information that describes a part that is sought for on a network-based marketplace. The system further infers the part has a compatibility based on the compatibility keywords. Next, the system searches a data storage device based on the item information and the compatibility keywords to identify a first listing as matched. Finally, the system presents the first listing describing the matched part. The matched part is indicated as compatible by supplementing the presentation of the first listing with the compatibility keywords from the first query.

20 Claims, 34 Drawing Sheets

Related U.S. Application Data

(60) Provisional application No. 61/105,392, filed on Oct. 14, 2008, provisional application No. 61/105,395, filed on Oct. 14, 2008, provisional application No. 61/105,399, filed on Oct. 14, 2008.

(56) References Cited

U.S. PATENT DOCUMENTS

| | | | |
|---|---|---|---|
| 7,454,378 | B1 | 11/2008 | White, Jr. |
| 7,617,128 | B2 | 11/2009 | Greak |
| 10,037,555 | B2* | 7/2018 | Bursey .............. G06Q 30/0605 |
| 2001/0042030 | A1 | 11/2001 | Ito et al. |
| 2001/0049631 | A1 | 12/2001 | Watts et al. |
| 2002/0013719 | A1 | 1/2002 | Shiiba et al. |
| 2003/0055812 | A1 | 3/2003 | Williams et al. |
| 2003/0195790 | A1 | 10/2003 | Wepfer et al. |
| 2004/0193432 | A1 | 9/2004 | Khalidi |
| 2005/0125261 | A1 | 6/2005 | Adegan |
| 2006/0015401 | A1 | 1/2006 | Chu et al. |
| 2007/0061303 | A1 | 3/2007 | Ramer et al. |
| 2007/0124216 | A1 | 5/2007 | Lucas |
| 2007/0207791 | A1* | 9/2007 | Sasaki ................ H04M 1/2748 455/418 |
| 2007/0208738 | A1 | 9/2007 | Morgan |
| 2007/0219982 | A1 | 9/2007 | Piper et al. |
| 2008/0059335 | A1 | 3/2008 | Tenorio et al. |
| 2009/0112688 | A1 | 4/2009 | Hart et al. |
| 2009/0157676 | A1* | 6/2009 | Shanbhag ........... G06F 16/9535 |
| 2009/0171803 | A1 | 7/2009 | Bagwell et al. |
| 2010/0094723 | A1 | 4/2010 | Johnson et al. |
| 2010/0153229 | A1 | 6/2010 | Bursey et al. |
| 2010/0153405 | A1 | 6/2010 | Johnson et al. |
| 2010/0153447 | A1 | 6/2010 | Johnson et al. |
| 2010/0299319 | A1 | 11/2010 | Parson et al. |
| 2011/0173543 | A1 | 7/2011 | Cockcroft et al. |

OTHER PUBLICATIONS

Appeal Decision for U.S. Appl. No. 12/579,404, mailed on Sep. 21, 2016, 5 pages.
Decision on Pre-Appeal Brief received for U.S. Appl. No. 12/579,404, mailed on Aug. 24, 2012, 2 pages.
Decision on Pre-Appeal Brief Request received for U.S. Appl. No. 12/685,441, mailed on Apr. 16, 2014, 2 pages.
Examiner's Answer received for U.S. Appl. No. 12/579,404, dated May 8, 2014, 12 pages.
Final office action received for U.S. Appl. No. 12/579,404, dated Jun. 6, 2013, 13 pages.
Final office action received for U.S. Appl. No. 12/579,404, dated Mar. 7, 2012, 12 pages.
Non-Final office action received for U.S. Appl. No. 12/579,404, dated Feb. 15, 2017, 13 pages.
Non-Final office action received for U.S. Appl. No. 12/579,404, dated Mar. 21, 2011, 11 pages.
Non-Final office action received for U.S. Appl. No. 12/579,404, dated Nov. 21, 2012, 12 pages.
Non-Final office action received for U.S. Appl. No. 12/579,404, dated Aug. 30, 2011, 10 pages.
Pre-Appeal Brief Request filed on Jul. 6, 2012 for U.S. Appl. No. 12/579,404, 4 pages.
Pre-Appeal Brief Request filed on Sep. 6, 2013 for U.S. Appl. No. 12/579,404, 5 pages.
Response to Final Office Action filed on May 7, 2012 for U.S. Appl. No. 12/579,404, dated Mar. 7, 2012, 13 pages.
Response to Non-Final Office Action filed on Aug. 1, 2013 for U.S. Appl. No. 12/579,404, dated Jun. 6, 2013, 10 pages.
Applicant Interview Summary received for U.S. Appl. No. 12/579,400, dated Jul. 13, 2017, 4 pages.
Examiner Interview Summary received for U.S. Appl. No. 12/579,400, dated Jan. 22, 2016, 10 pages.
Final office action received for U.S. Appl. No. 12/579,400, dated Dec. 27, 2016, 21 pages.
Final office action received for U.S. Appl. No. 12/579,400, dated Jul. 19, 2012, 13 pages.
Final office action received for U.S. Appl. No. 12/579,400, dated Oct. 8, 2015, 23 pages.
Non-Final office action received for U.S. Appl. No. 12/579,400, dated Jun. 19, 2014, 18 pages.
Non-Final office action received for U.S. Appl. No. 12/579,400, dated Dec. 22, 2011, 11 pages.
Non-Final office action received for U.S. Appl. No. 12/579,400, dated Jan. 23, 2015, 15 pages.
Non-Final office action received for U.S. Appl. No. 12/579,400, dated Jun. 30, 2016, 21 pages.
Response to Final Office Action filed on Oct. 19, 2012, for U.S. Appl. No. 12/579,400, dated Jul. 19, 2012, 12 pages.
Response to Non-Final office action filed on Feb. 8, 2016 for U.S. Appl. No. 12/579,400, dated Oct. 8, 2015, 23 pages.
Response to Non-Final Office Action filed on Jun. 23, 2015 for U.S. Appl. No. 12/579,400, dated Jan. 23, 2015, 24 pages.
Response to Non-Final Office Action filed on Mar. 19, 2012 for U.S. Appl. No. 12/579,400, dated Dec. 22, 2011, 15 pages.
Appeal Brief filed on May 19, 2014 for U.S. Appl. No. 12/579,404, 20 pages.
Response to Non-Final office action received for U.S. Appl. No. 12/579,400, filed Sep. 19, 2016, dated Jun. 30, 2016, 17 pages.
Advisory Action received for U.S. Appl. No. 12/579,402, dated Jan. 17, 2012, 3 pages.
Appeal Brief filed on Aug. 1, 2012 for U.S. Appl. No. 12/579,402, 15 pages.
Appeal decision received for U.S. Appl. No. 12/579,402, mailed on Dec. 11, 2015, 9 pages.
Decision on Pre-Appeal Brief Request received for U.S. Appl. No. 12/579,402, mailed on Jun. 1, 2012, 2 pages.
Examiner's Answer received for U.S. Appl. No. 12/579,402, dated Jun. 20, 2013, 12 pages.
Final Office Action received for U.S. Appl. No. 12/579,402, dated Jun. 29, 2017, 26 pages.
Final office action received for U.S. Appl. No. 12/579,402, dated Oct. 12, 2011, 13 pages.
Non-Final office action received for U.S. Appl. No. 12/579,402, dated Apr. 1, 2011, 13 pages.
Non-Final office action received for U.S. Appl. No. 12/579,402, dated Apr. 7, 2016, 21 pages.
Non-Final office action received for U.S. Appl. No. 12/579,402, dated Nov. 21, 2012, 13 pages.
Non-Final office action received for U.S. Appl. No. 12/579,402, dated Nov. 23, 2016, 21 pages.
Pre-Appeal Brief Request for Review filed on Feb. 13, 2012 for U.S. Appl. No. 12/579,402, 5 pages.
Reply Brief filed on Aug. 20, 2013 for U.S. Appl. No. 12/579,402, 13 pages.
Response to Final Office Action filed on Dec. 12, 2011 for U.S. Appl. No. 12/579,402, dated Oct. 12, 2011, 15 pages.
Response to Non-Final office action filed filed on Mar. 23, 2017 for U.S. Appl. No. 12/579,402, dated Nov. 23, 2016, 15 pages.
Response to Non-Final office action filed on Jul. 7, 2016 for U.S. Appl. No. 12/579,402, dated Apr. 7, 2016, 11 pages.
Response to Non-Final Office Action filed on Jun. 29, 2011 for U.S. Appl. No. 12/579,402, dated Apr. 1, 2011, 12 pages.
Supplemental Appeal Brief filed on Feb. 21, 2013 for for U.S. Appl. No. 12/579,402, 19 pages.
Advisory action received for U.S. Appl. No. 12/579,404, dated Aug. 22, 2013, 3 pages.
Advisory Action received for U.S. Appl. No. 12/579,404, dated Jun. 14, 2012, 3 pages.
Appeal Brief filed on Jan. 7, 2014 for U.S. Appl. No. 12/579,404, 20 pages.
Written Opinion received for PCT Application No. PCT/US2011/020589, dated Mar. 17, 2011, 5 pages.
International Search Report received for PCT Application No. PCT/US2011/020589, dated Mar. 17, 2011, 2 pages.

(56) References Cited

OTHER PUBLICATIONS

International Preliminary Report on Patentability received for PCT Application No. PCT/US2011/020589, dated Jul. 26, 2012, 7 pages.
Response to Non Final office action filed on Sep. 30, 2013 for U.S. Appl. No. 12/685,441, dated Jun. 28, 2013, 12 pages.
Response to Final office action filed on Jan. 22, 2013 for U.S. Appl. No. 12/685,441, dated Nov. 21, 2012, 12 pages.
Response to Final office action filed on Feb. 18, 2014 for U.S. Appl. No. 12/685,441, dated Dec. 16, 2013, 12 pages.
Response to Final office action filed on Aug. 6, 2012 for U.S. Appl. No. 12/685,441, dated Apr. 4, 2012, 12 pages.
Reply Brief filed on Sep. 30, 2014 for U.S. Appl. No. 12/685,441, 14 pages.
Pre-Appeal Brief Request filed on Mar. 17, 2014 for U.S. Appl. No. 12/685,441, 5 pages.
Non-Final office action received for U.S. Appl. No. 12/685,441, dated Apr. 4, 2012, 13 pages.
Non Final Office Action received for U.S. Appl. No. 12/685,441, dated Jun. 28, 2013, 13 pages.
Final Office Action received for U.S. Appl. No. 12/685,441, dated Nov. 21, 2012, 13 pages.
Final office action received for U.S. Appl. No. 12/685,441, dated Dec. 16, 2013, 14 pages.
Examiner's Answer received for U.S. Appl. No. 12/685,441, dated Jul. 31, 2014, 12 pages.
Advisory Action received for U.S. Appl. No. 12/685,441, dated Feb. 4, 2013, 3 pages.
Advisory Action received for U.S. Appl. No. 12/685,441, dated Feb. 25, 2014, 3 pages.
Pre-Appeal Brief Request filed on Oct. 22, 2018 for U.S. Appl. No. 12/579,404, 6 pages.
U.S. Appl. No. 12/579,398, filed Oct. 14, 2009, Issued.
Non-Final Office Action received for U.S. Appl. No. 12/579,398, dated Aug. 11, 2017, 12 pages.
Notice of Allowability Received for U.S. Appl. No. 12/579,398 dated May 8, 2018, 5 pages.
Notice of Allowance received for U.S. Appl. No. 12/579,398 dated Mar. 27, 2018, 6 pages.
Response to Final Office Action filed on Feb. 11, 2016 for U.S. Appl. No. 12/579,398, dated Aug. 31, 2012, 14 pages.
Response to Non-Final Office Action filed on Nov. 10, 2017 for U.S. Appl. No. 12/579,398, dated Aug. 11, 2017, 23 pages.
Response to Non-Final Office Action filed on Nov. 15, 2016 for U.S. Appl. No. 12/579,398, dated Aug. 15, 2016, 21 pages.
Decision on Pre-Appeal Brief received for U.S. Appl. No. 12/579,404, mailed on Mar. 19, 2018, 2 pages.
Final Office Action received for U.S. Appl. No. 12/579,404, dated Nov. 17, 2017, 18 pages.
Non-Final Office Action received for U.S. Appl. No. 12/579,404, dated Aug. 2, 2018, 19 pages.
Advisory Action received for U.S. Appl. No. 12/579,398, dated Nov. 7, 2012, 3 pages.
Appeal Brief filed for U.S. Appl. No. 12/579,398, on Feb. 15, 2013, 22 pages.
Appeal Decision received for U.S. Appl. No. 12/579,398, mailed on Dec. 11, 2015, 11 pages.
Decision on Pre-Appeal Brief received for U.S. Appl. No. 12/579,398, mailed on Jan. 15, 2013, 2 pages.
Examiner Answer to Appeal Brief received for U.S. Appl. No. 12/579,398, mailed on Dec. 19, 2013, 10 pages.
Final Office Action received for U.S. Appl. No. 12/579,398, dated Aug. 31, 2012, 10 pages.
Final Office Action received for U.S. Appl. No. 12/579,398, dated Feb. 27, 2017, 13 pages.
Non-Final Office Action received for U.S. Appl. No. 12/579,398, dated Apr. 13, 2012, 9 pages.
Non-Final Office Action received for U.S. Appl. No. 12/579,398, dated Aug. 15, 2016, 16 pages.
Pre-Appeal Brief Request filed for U.S. Appl. No. 12/579,398, on Nov. 30, 2012, 5 pages.
Reply Brief filed on Feb. 19, 2014, for U.S. Appl. No. 12/579,398, 6 pages.
Response to Final Office Action filed on Jun. 9, 2017 for U.S. Appl. No. 12/579,398, dated Feb. 27, 2017, 36 pages.
Response to Final Office Action filed on Oct. 31, 2012 for U.S. Appl. No. 12/579,398, dated Aug. 31, 2012, 12 pages.
Response to Non-Final Office Action filed on Aug. 13, 2012 for U.S. Appl. No. 12/579,398, dated Apr. 13, 2012, 12 pages.
Decision on Pre-Appeal Brief received for U.S. Appl. No. 12/579,404, mailed on Nov. 7, 2013, 2 pages.
Response to Non-Final Office Action filed on Feb. 21, 2013 for U.S. Appl. No. 12/579,404, dated Nov. 21, 2012, 10 pages.
Response to Non-Final Office Action filed on Jun. 9, 2011 for U.S. Appl. No. 12/579,404, dated Mar. 21, 2011, 12 pages.
Response to Non-Final office action filed on May 15, 2017 for U.S. Appl. No. 12/579,404, dated Feb. 15, 2017, 11 pages.
Response to Non-Final Office Action filed on Nov. 30, 2011 for U.S. Appl. No. 12/579,404, dated Aug. 30, 2011, 11 pages.
Response to Non-Final Office Action filed on Oct. 20, 2014 for U.S. Appl. No. 12/579,400, dated Jun. 19, 2014, 14 pages.
Examiner Answer to Appeal Brief received for U.S. Appl. No. 12/579,404, mailed Jun. 3, 2019, 18 pages.
Appeal Brief filed on Jan. 4, 2019, for U.S. Appl. No. 12/579,404, 15 pages.
Decision on Pre-Appeal Brief received for US. Appl. No. 12/579,404, mailed on Dec. 5, 2018, 2 pages.

\* cited by examiner

FIG.1A
INFORMATION ENTERED BY SELLER
TO LIST PART FOR SALE
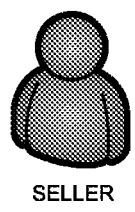
SELLER
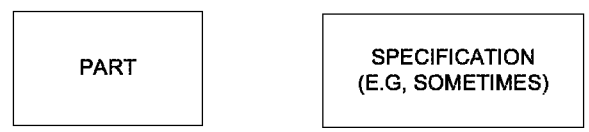
PART | SPECIFICATION (E.G, SOMETIMES)
FIG.1B
INFORMATION ENTERED BY BUYER
TO QUERY FOR LISTINGS
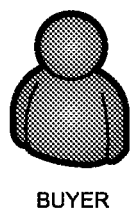
BUYER
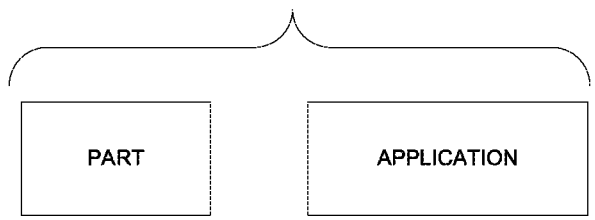
PART | APPLICATION
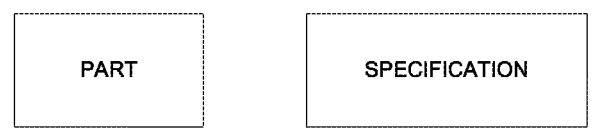
PART | SPECIFICATION

FIG.18A

510 — KEYWORD INDEX INFORMATION

| KEYWORD (512) | ATTRIBUTE-KEYWORD PAIR (514) |
|---|---|
| "HONDA" | MAKE=HONDA |
| "ACCORD" | MODEL=ACCORD |
| "CAMRY" | MAKE=CAMRY |
| "V8" | ENGINE=V8 |
| "2002" | IF MAKE=BMW THEN MODEL=2002, ELSE YEAR=2002 |
| "FORD" | MAKE=FORD |
| ... | |
| .... | |
| "CHEVY" | MAKE=CHEVROLET |
| "CHEV" | MAKE=CHEVROLET |
| "CHEVROLET" | MAKE=CHEVROLET |
| "CHRYSLER" | MAKE=CHRYSLER |
| "EL CAMINO" | MODLE=EL CAMINO |
| "ALPHA ROMEO" | MAKE=ALFA ROMEO |

FIG.18B

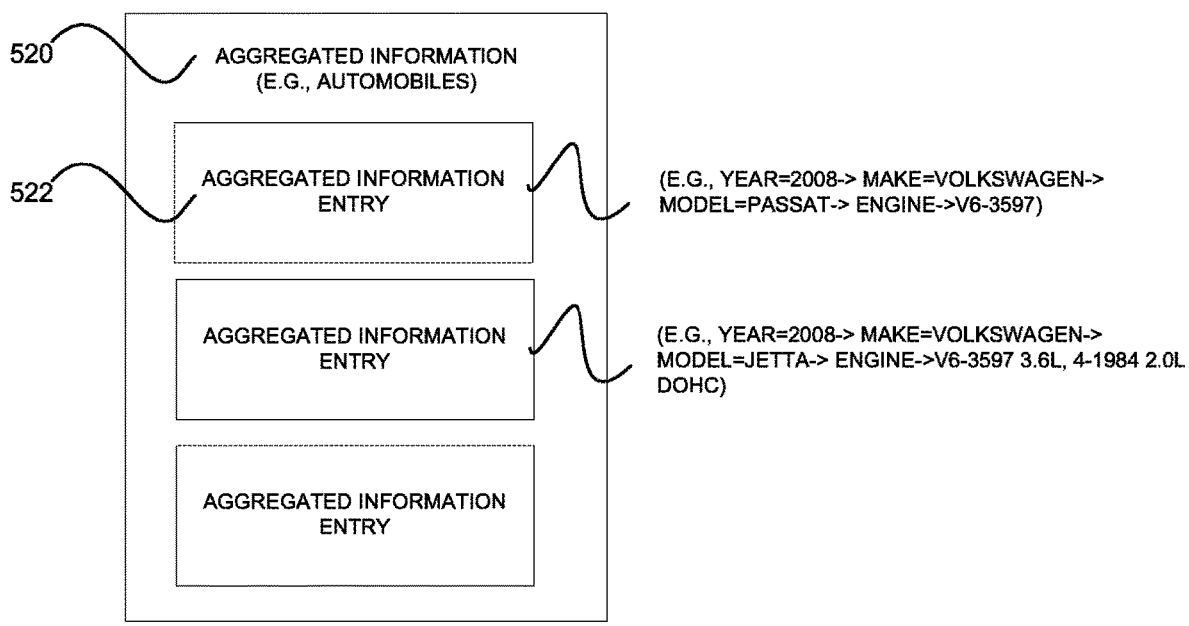

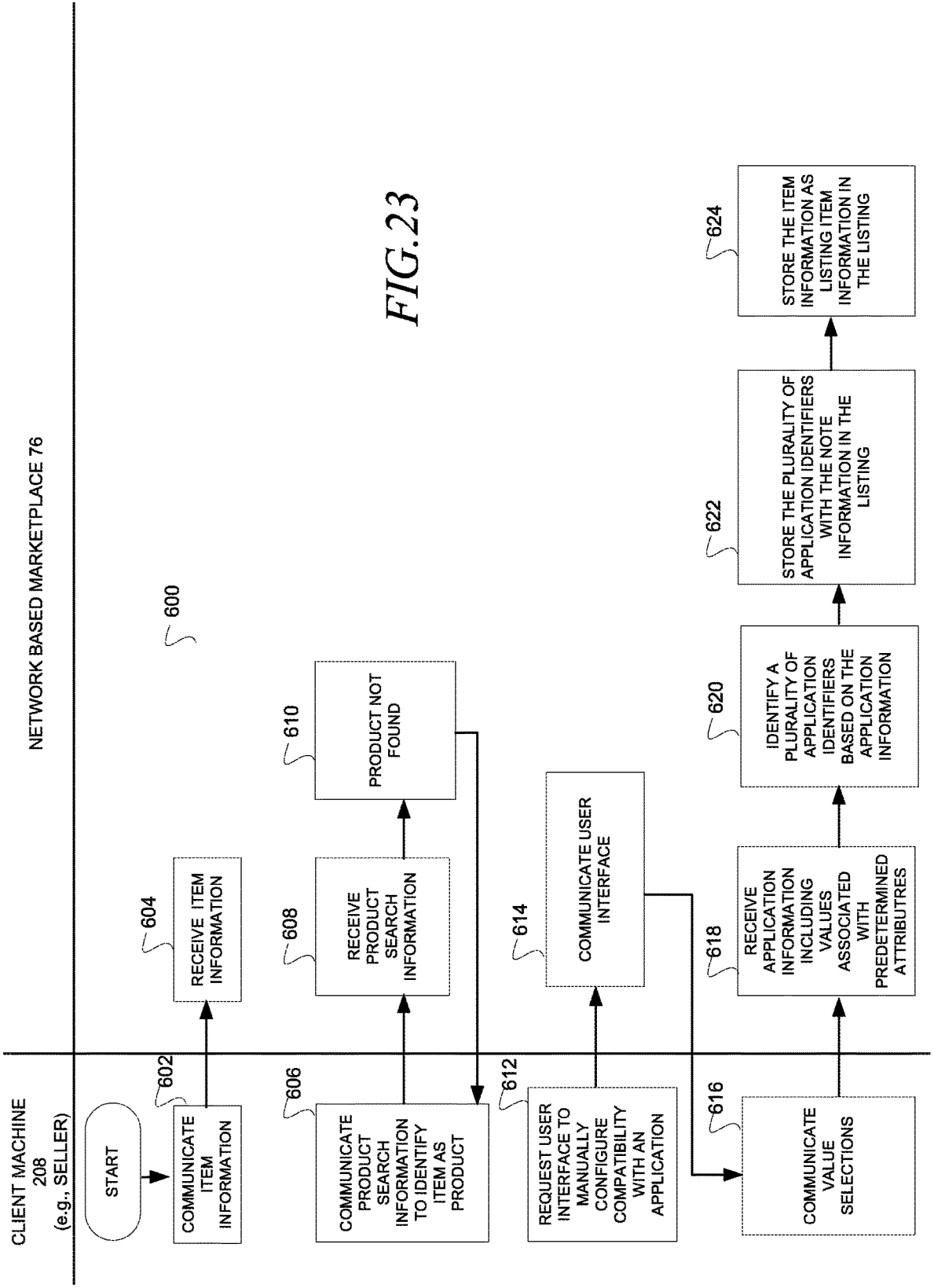

SYSTEMS AND METHODS TO SUPPLEMENT SEARCH RESULTS RETURNED TO A BUYER OF PARTS

CROSS REFERENCE TO RELATED APPLICATIONS

This application is a continuation of U.S. patent application Ser. No. 12/579,398, filed Oct. 14, 2009, and entitled "SYSTEMS AND METHODS TO SUPPLEMENT SEARCH RESULTS RETURNED TO A BUYER OF PARTS," which claims the priority benefits of U.S. Provisional Application No. 61/105,392, filed Oct. 14, 2008, and entitled "COMPATIBILITY ENGINE"; and U.S. Provisional Application No. 61/105,395, filed Oct. 14, 2008, entitled "SYSTEM TO ADD STRUCTURED COMPATIBILITY DATA FROM PRODUCT CATALOGS TO LISTINGS"; and U.S. Provisional Application No. 61/105,399, filed Oct. 14, 2008, and entitled "PARTS AND ACCESSORIES FITMENT USING COMPATIBILITY DATA." Each of the aforementioned applications is herein incorporated by reference in its entirety.

TECHNICAL FIELD

This disclosure relates to the technical field of data communications and, more particularly, to systems and methods to supplement search results returned to a buyer of parts.

BACKGROUND

Buyers and sellers of parts may sometimes be unable to rendezvous in a marketplace. Sellers may list a part without knowledge of different and varied applications that may be compatible with the part. This sometimes hinders the buyer who may search for the part by querying for the part in the context of an application or specification.

BRIEF DESCRIPTION OF THE DRAWINGS

Embodiments illustrated by way of example and not limitation in the figures of the accompanying drawings, in which:

FIG. 1A is a block diagram illustrating information entered by a seller, according to an embodiment;

FIG. 1B is a block diagram illustrating information entered by a buyer, according to an embodiment, to query for listings;

FIG. 18A is a block diagram illustrating keyword index information, according to an embodiment;

FIG. 18B is a block diagram illustrating aggregated information, according to an embodiment;

FIG. 23 is a flow chart illustrating a method to initialize a data source based on a compatibility with an application, according to an embodiment;

FIGS. 30-33B are diagrams illustrating various user interfaces, according to an embodiment.

DETAILED DESCRIPTION

In the following description, for purposes of explanation, numerous specific details are set forth in order to provide a thorough understanding of some example embodiments. It will be evident, however, to one of ordinary skill in the art that embodiments of the present disclosure may be practiced without these specific details.

As described further below, according to various example embodiments of the disclosed subject matter described and claimed herein, systems and methods to supplement search results returned to a buyer of parts are described. Various embodiments are described below in connection with the figures provided herein.

The example embodiments described herein seek to assist sellers to efficiently list items and buyers to efficiently to find items. Items may be parts or components that have an assembly (e.g., parts that fit an application). While many of the example embodiments are discussed in the context of determining a compatibility of automotive parts with particular vehicles, it will be appreciated that the methods and systems described herein may be applied to a broad range of compatibility use scenarios (e.g., parts for computers, washing machines, lawn mowers, scooters, buildings, doors, tractors, solar panels, bikes, airplanes, aircrafts, motorcycles, boats, or any other application that may be assembled with parts). Further, it will be appreciated that the methods and systems described herein may be applied to a broad range of technical problems some of which are described as follows.

FIG. 1A is a block diagram illustrating information 6 entered by a seller to list a part for sale on an electronic marketplace. Consider a seller that desires to sell a part on an electronic marketplace. Typically the seller provides information describing the part. For example, the seller may describe a set of brake pads by providing a title and description. In some instances, the seller may provide a specification for the part. For example, the seller may provide a specification that is written on the part or may know the part was manufactured according to an industry standard.

FIG. 1B is a block diagram illustrating information 8 entered by a buyer to find listings of parts. Consider a buyer that desires to acquire a part on an electronic marketplace. Typically the buyer provides information describing the part. In some instances, the buyer may provide a specification for the part or an application that is compatible with the part. For example, the seller may query "brake pads Toyota Tacoma Truck."

Figure 2A:
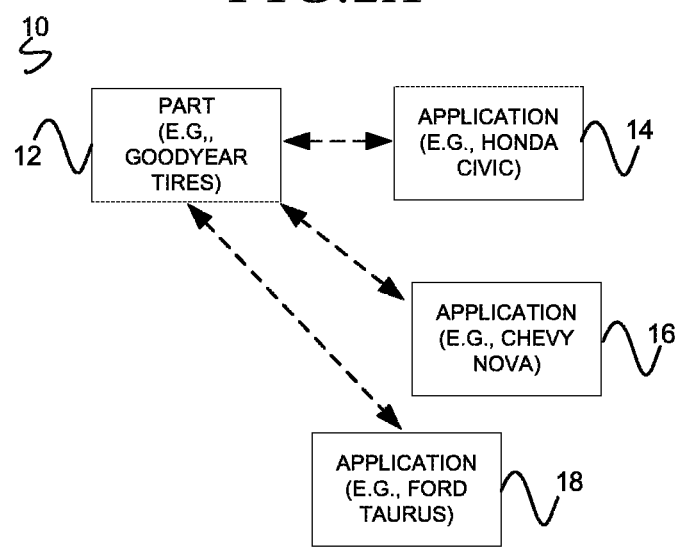
FIG. 2A is a block diagram illustrating a relationship, according to an embodiment, between a part and applications.

FIG. 2A is a block diagram illustrating a relationship 10, according to an embodiment, between a part 12 and one or more applications 14. In the present context, an application may be any entity that is compatible with an item (e.g., part) such that the part "fits" the entity. For example, an item may be an alternator and the alternator may fit an entity such as a Toyota Tacoma truck. Accordingly, the relationship 10 may be described as a "fits a" relationship 10 because the part 12 or item may be said to fit one or more of the applications 14. Indeed, the part 12 may further be said to be compatible with the applications 14, 16, and 18. For example, the part 12 in the form of "GOODYEAR TIRES" may fit or be compatible with applications 14 in the form of a "HONDA CIVIC," "CHEVY NOVA," or a "FORD TAURUS." In contrast, other applications may not exhibit this relationship 10 with the part 12.

Figure 2B:
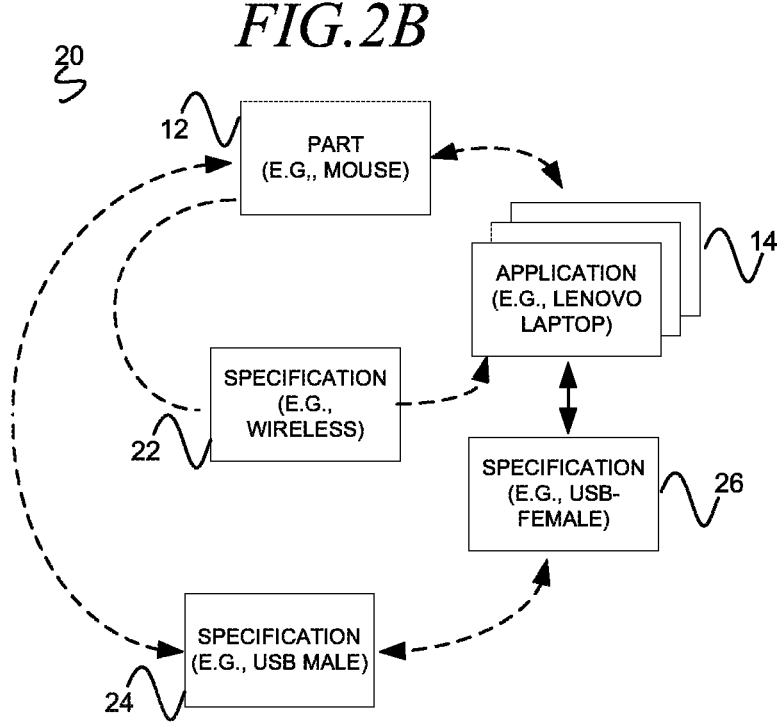
FIG. 2B is a block diagram illustrating a compatibility between a part and applications by specification, according to an embodiment.

FIG. 2B is a block diagram illustrating a relationship 20, according to an embodiment, between a part 12, a specification 22, and an application 14. The relationship 20 may be described as an "interface" relationship 20 because the specification 22 is shared by the part 12 and the applications 14. Indeed, the part 12 or item may further be said to be compatible with the applications 14 because the part 12 or item shares the interface with the applications 14. For example, the part 12 or item in the form of a computer mouse may be compatible with the applications 14 in the form of a Lenovo laptop because the mouse shares a wireless specification 22 with the Lenovo laptop. Further, for example, the part 12 may be compatible with the applications 14 because the part 12 shares a path of specifications 24, 26 that may be traversed from the part 12 to the applications 14 or from the applications 14 to the part 12. For example, the path "USB-MALE" and "USB-FEMALE" may be traced from the mouse to the Lenovo laptop or back.

Figure 3:
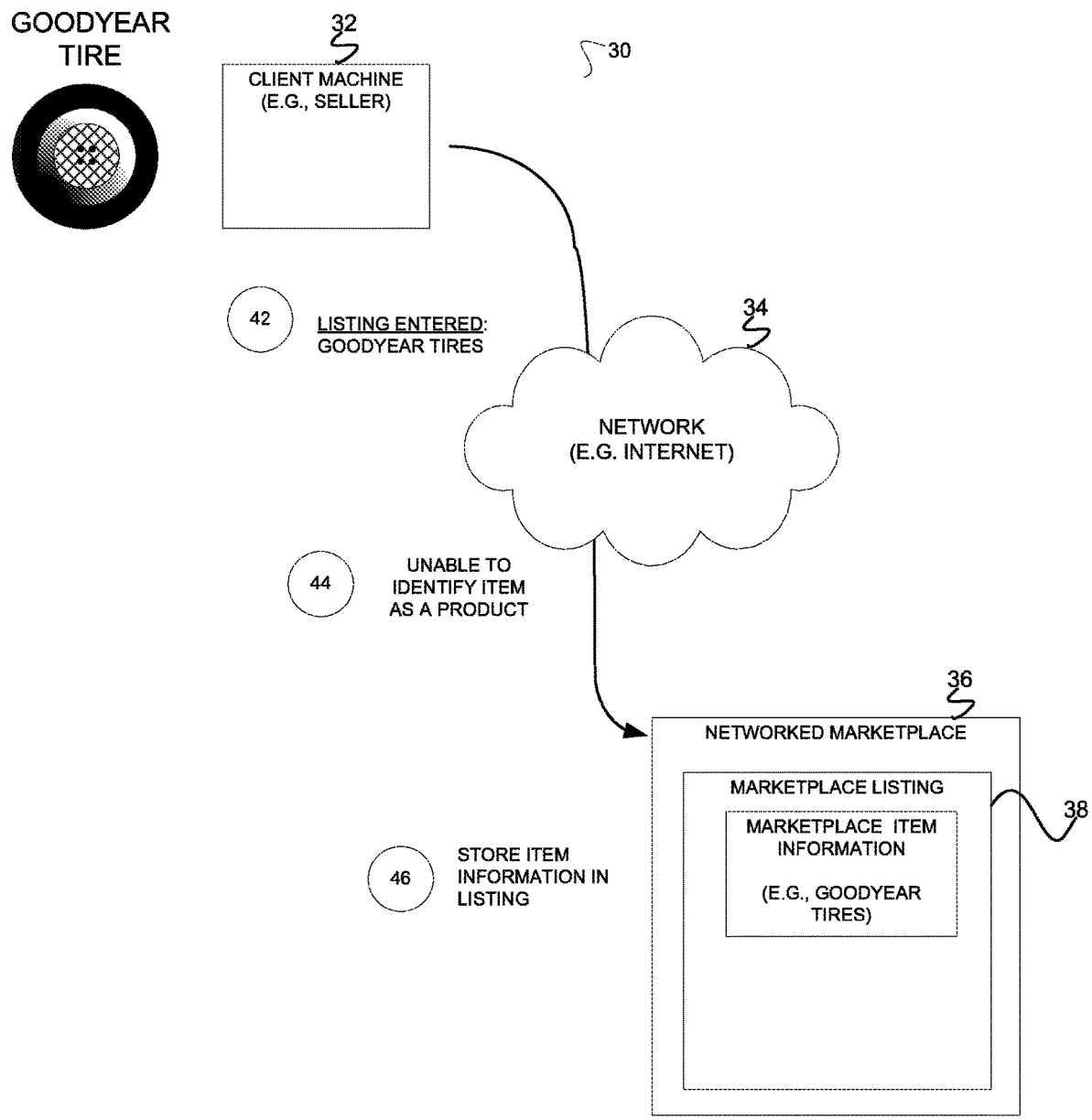
FIG. 3 is a block diagram illustrating a prior art system, according to an embodiment, to list an item.

FIG. 3 is a block diagram illustrating a prior art system 30 to list an item. The prior art system 30 is presented to illustrate a deficiency in the prior art with respect to listing an item on an electronic marketplace. The system 30 includes a client machine 32 that communicates over a network 34 (e.g., the Internet) with a networked-marketplace 36. At operation 42 a seller at the client machine 32 may list a tire for sale. At operation 44, the seller may attempt to identify the tire in a product catalogue. Identification of the tire in the product catalogue may be used to supplement the seller's listing with information from the catalogue (e.g., specifications, compatible applications, marketing information, pictures, etc). At operation 44, the seller is not successful in identifying the tire as a product, and at operation 46 a marketplace listing 38 for the tire is stored on the networked-marketplace 36. Accordingly, the marketplace listing 38 is not supplemented with information from the catalogue for failure to identify the item as a product in a catalogue.

Figure 4:
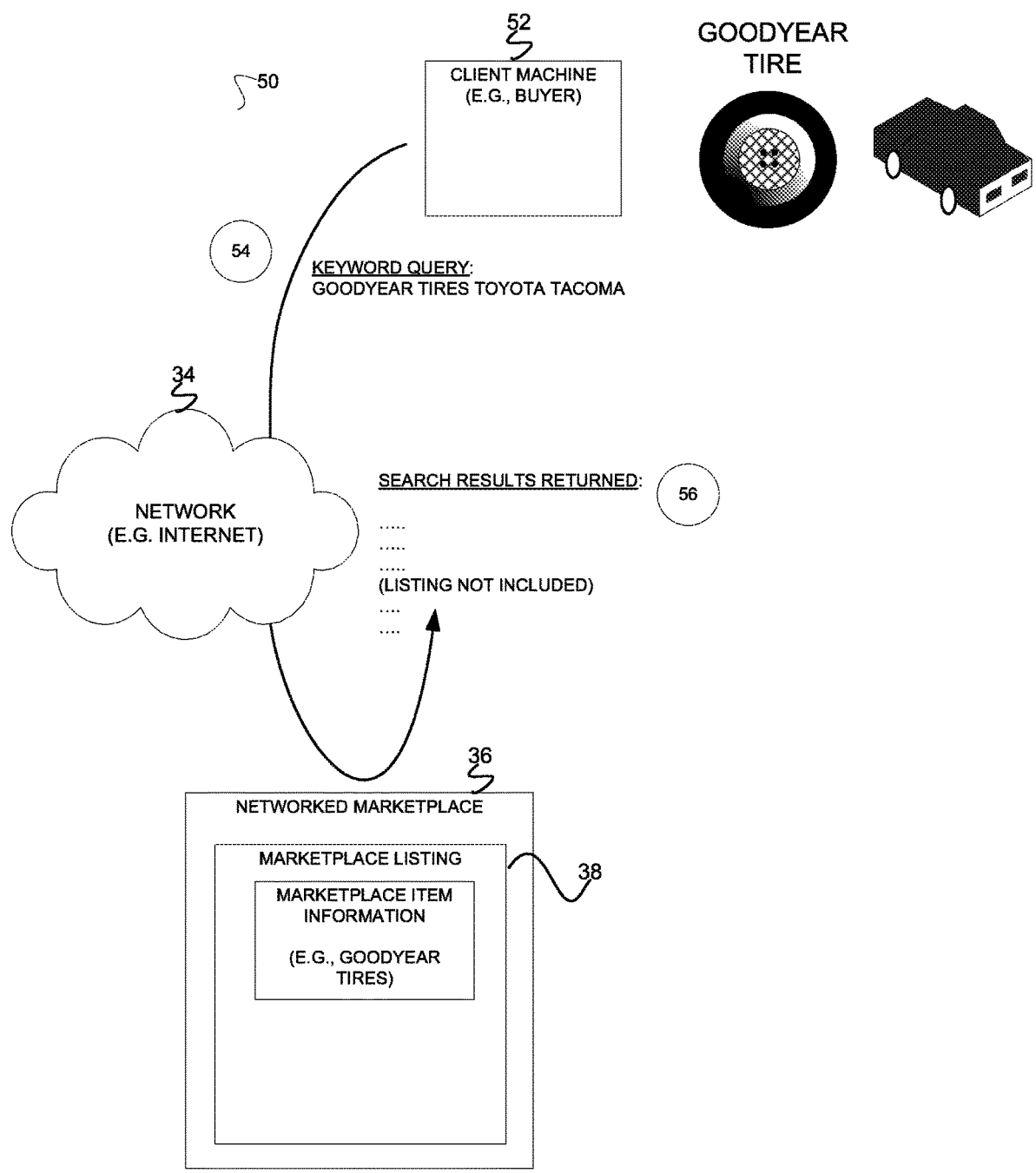
FIG. 4 is a block diagram illustrating a prior art system, according to an embodiment, to retrieve an item.

FIG. 4 is a block diagram illustrating a prior art system 50 to retrieve an item. The prior art system 50 is presented to illustrate a second deficiency in the prior art with respect to retrieving items from an electronic marketplace. The prior art system 50 includes a client machine 52 that communicates over a network 34 (e.g., the Internet) with a networked-marketplace 36. At operation 54, a buyer at the client machine 52 may enter the query "Goodyear Tires Toyota Tacoma." At operation 56, the networked-marketplace 36 returns search results that do not include the marketplace listing 38 for "Goodyear Tires." The networked-marketplace 36 fails to returns search results with the marketplace listing 38 for "Goodyear Tires" because the marketplace listing 38 fails to include the additional information requested by the seller, namely, "Toyota Tacoma." Nevertheless, the "Goodyear Tires" described in the marketplace listing 38 may indeed be compatible with "Toyota Tacoma."

Figure 5:
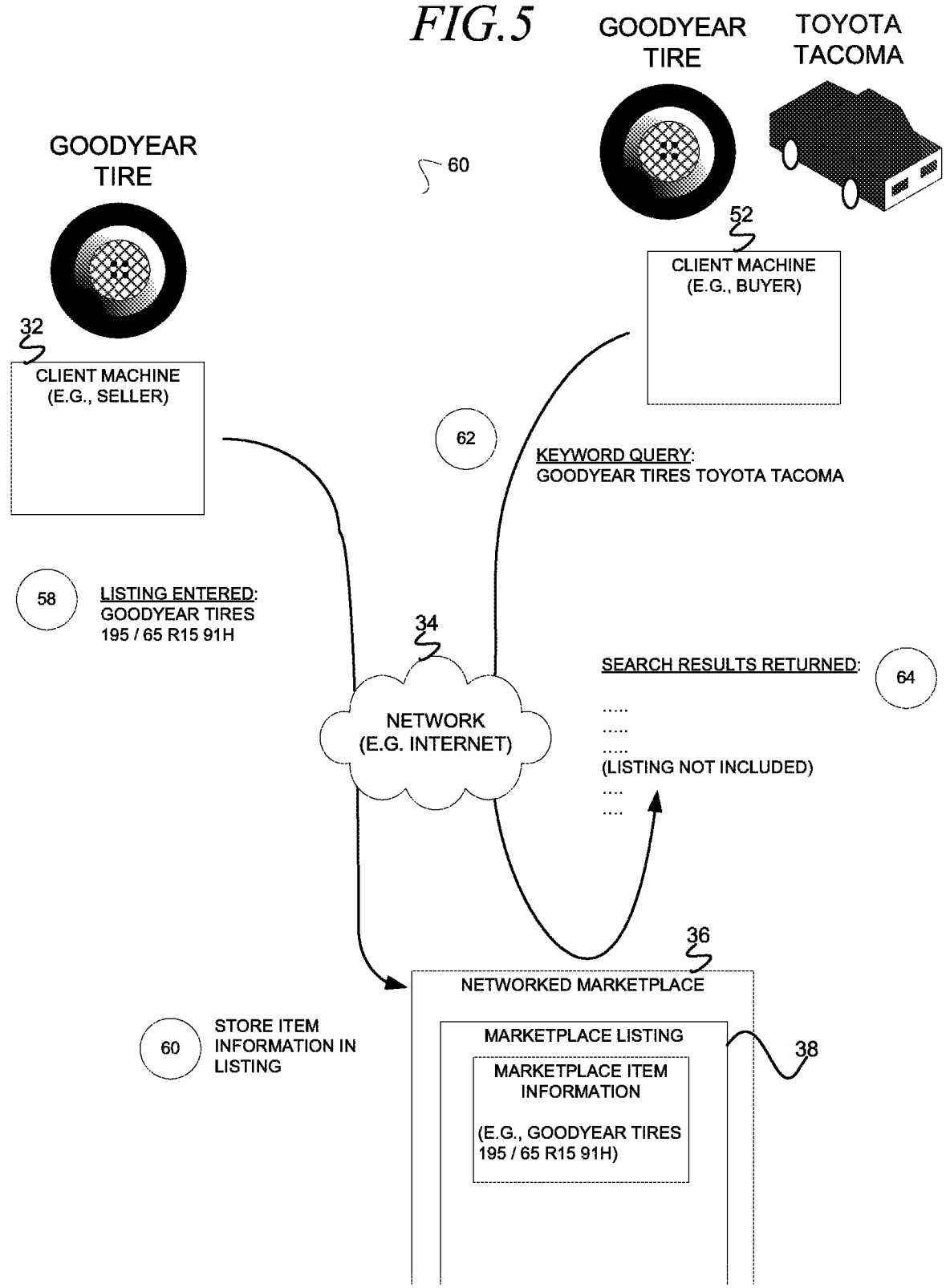
FIG. 5 is a block diagram illustrating a prior art system, according to an embodiment, to list and retrieve an item.

FIG. 5 is a block diagram illustrating a prior art system 60 to list and retrieve an item. The prior art system 60 is presented to illustrate a third deficiency in the prior art with respect to storing and retrieving items from electronic marketplaces. The prior art system 60 includes a client machine 32 that communicates over a network 34 (e.g., the Internet) with a networked-marketplace 36. At operation 58, a seller at the client machine 32 may list "Goodyear Tires" for sale. In addition, the seller provides a specification for the tires (e.g., 195/65 R15 91H). At operation 60, a marketplace listing 38 is stored on the networked-marketplace 36 including the description of the tires and the specification. The prior art system 60 further includes a client machine 52 that communicates over the network 34 with the networked-marketplace 36. At operation 62, a buyer at the client machine 52 may enter the query "Goodyear Tires Toyota Tacoma." At operation 64, the networked-marketplace 36 returns search results that do not include the marketplace listing 38 for "Goodyear Tires." Nevertheless, the "Goodyear Tires" described in the marketplace listing 38 may indeed be compatible with the "Toyota Tacoma."

Aspects of the Present Disclosure

Figure 6:
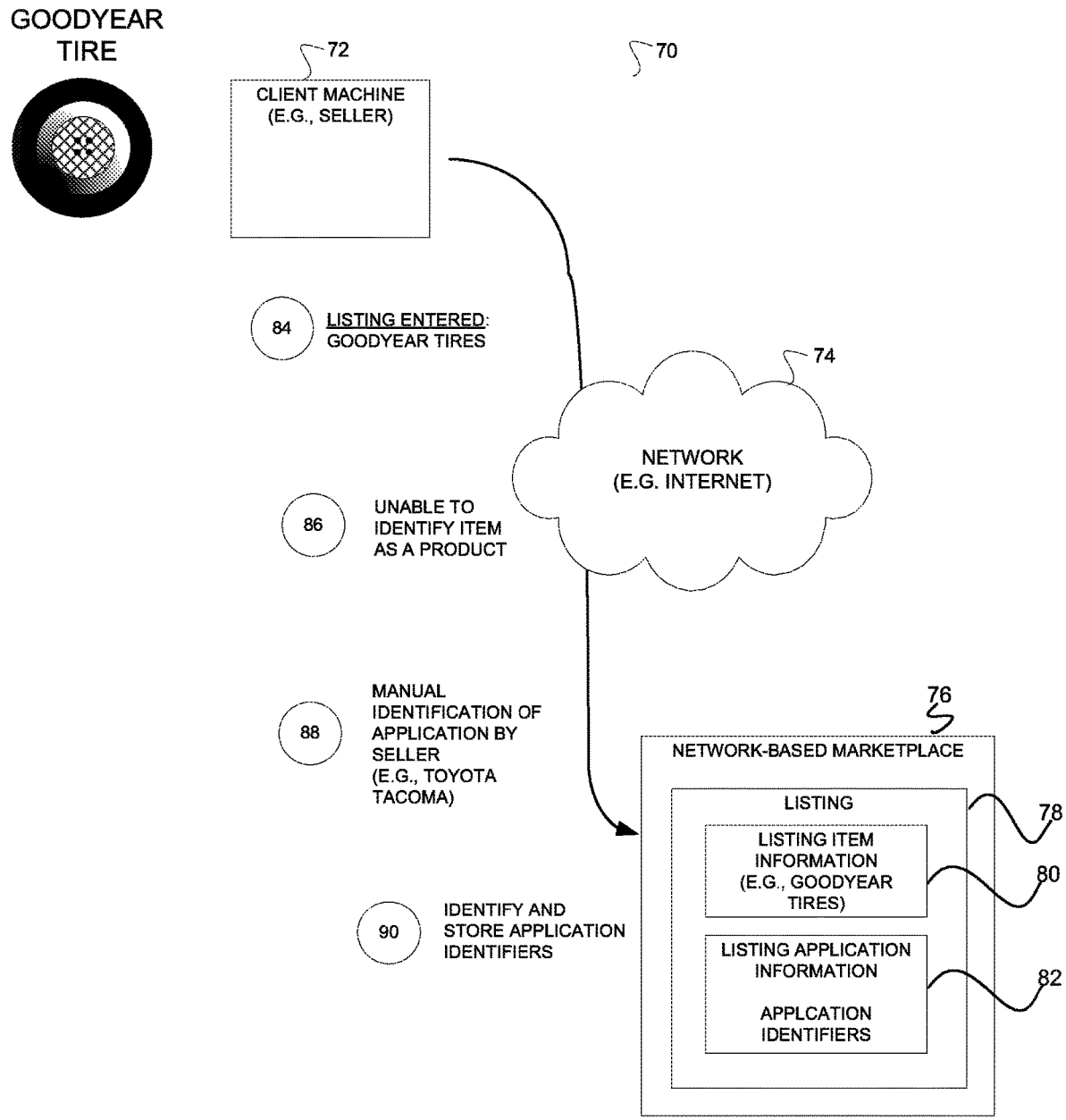
FIG. 6 is a block diagram illustrating a system, according to an embodiment, to initialize a data source based on a compatibility with an application.

According to a first aspect of the present disclosure systems and methods to initialize a data source based on a compatibility with an application are described. FIG. 6 is a block diagram illustrating a system 70, according to an embodiment, to initialize a data source based on a compatibility with an application. The system 70 is shown to include a client machine 72 that communicates over a network 74 (e.g., the Internet) with a network-based marketplace 76. At operation 84 the seller may enter a listing for "Goodyear Tires," and at operation 86 the seller may be unable to identify the "Goodyear Tires" in a product catalogue. Nevertheless, at operation 88, the network-based marketplace 76 may facilitate the seller to manually identify applications that are compatible with "Goodyear Tires" by communicating a user interface to the seller that may receive application information from the seller, the application information describing one or more applications. For example, the network-based marketplace 76 may utilize the application information to identify application identifiers that respectively identify various permutations of the identified application. For example, the application information "Toyota Tacoma" may be utilized to identify application identifiers describing various Toyota Tacoma Trucks according to years, engine size, trim, etc. At operation 90, the network-based marketplace 76 may store the application identifiers in the listing 78 as listing application information 82 and the item information as listing item information 80.

Figure 7:
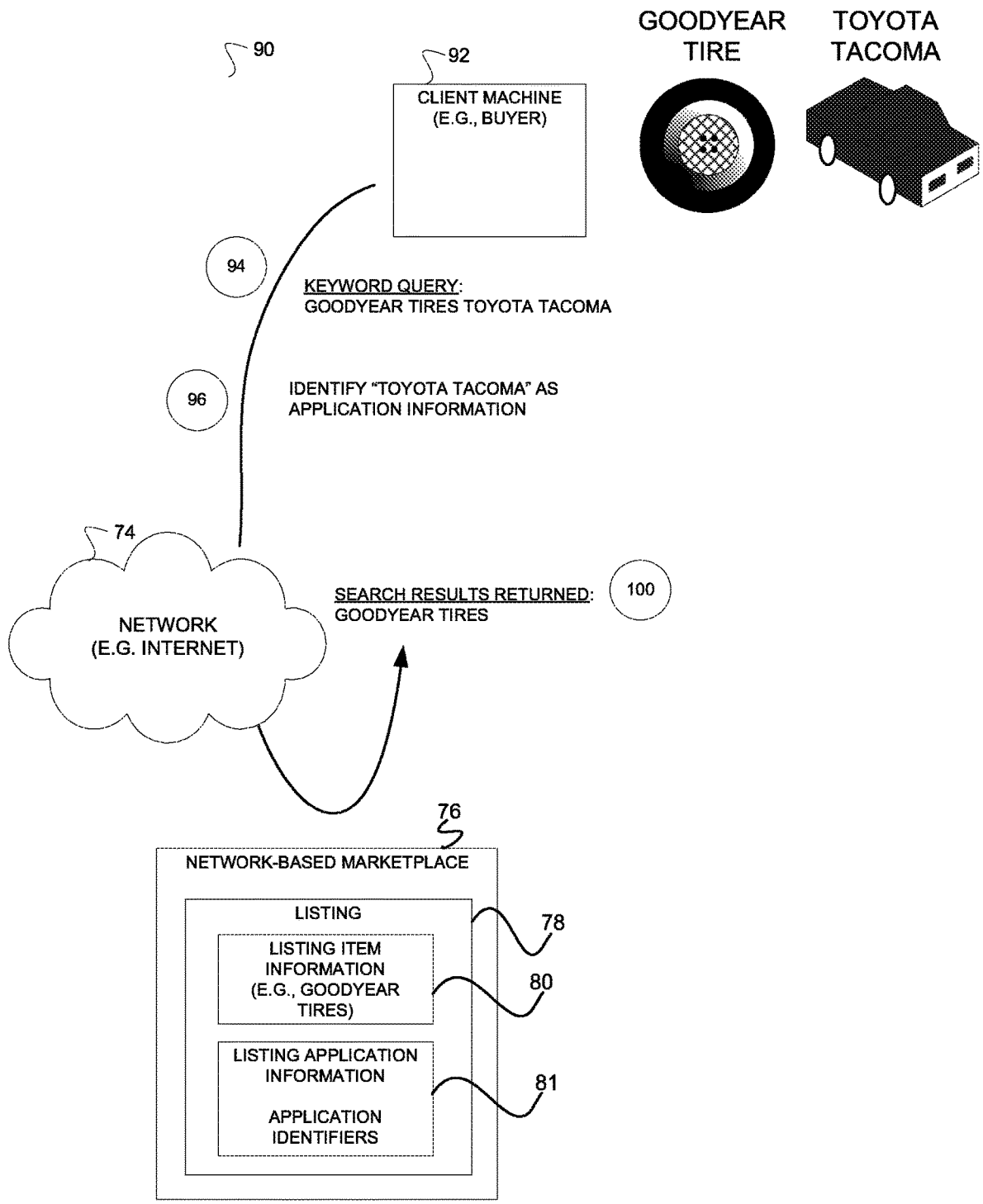
FIG. 7 is a block diagram illustrating a system, according to an embodiment, to search a data source based on a compatibility with an application.

According to a second aspect of the present disclosure systems and methods to search a data source based on compatibility with an application are described. FIG. 7 is a block diagram illustrating a system 90, according to an embodiment, to search a data source based on a compatibility with an application. The system 90 includes a client machine 92 that communicates over a network 74 (e.g., the Internet) with a network-based marketplace 76. At operation 94, a buyer at the client machine 92 may enter the query "Goodyear Tires Toyota Tacoma." At operation 96, the network-based marketplace 76 may identify the compatibility keywords "Toyota Tacoma" as application information and infer the remaining keywords in the query as item information that describe a part that the buyer is searching for on a network-based marketplace 76 (e.g., tires). At operation 100, the network-based marketplace 76 may return search results that include the listing 78 for "Goodyear Tires." The network-based marketplace 76 may identify the listing 78 as matched by comparing the application information received in the query with the listing application information 81 in the listing 78 and by comparing the item information received in the query with the listing item information 80 in the listing 78.

Figure 8:
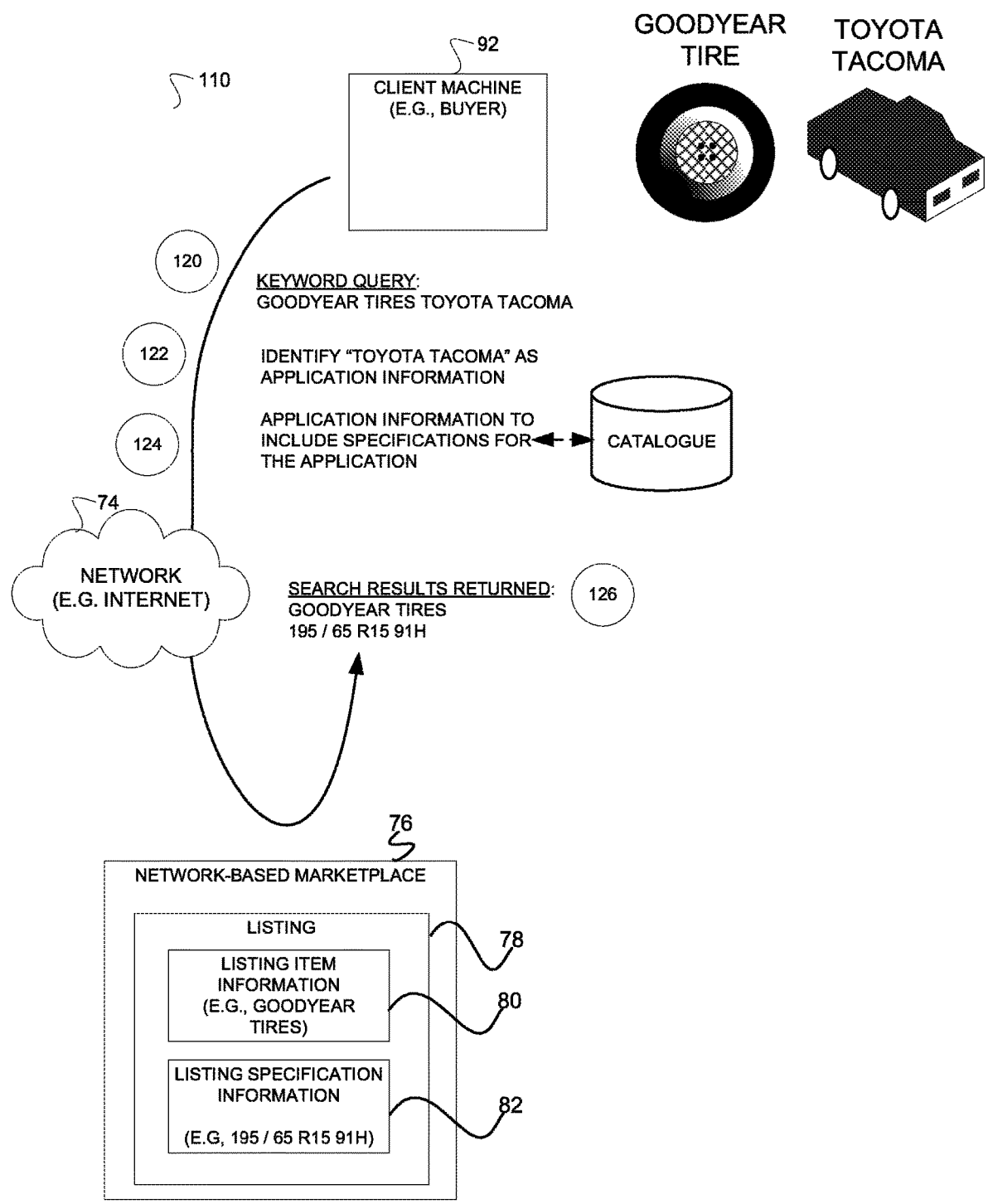
FIG. 8 is a block diagram illustrating a system, according to an embodiment, to search a data source based on a compatibility via a specification.

According to a third aspect of the present disclosure systems and methods to search a data source based on compatibility via a specification are described. FIG. 8 is a block diagram illustrating a system 110, according to an embodiment, to search a data source based on compatibility via a specification. The system 110 includes a client machine 92 that communicates over a network 74 (e.g., the Internet) with a network-based marketplace 76. At operation 120, a buyer at the client machine 92 may enter the query "Goodyear Tires Toyota Tacoma." At operation 122, the network-based marketplace 76 may identify the keywords "Toyota Tacoma" as application information and infer the remaining keywords in the query as item information that describes the tires. At operation 124, the network-based marketplace 76 may expand the application information (e.g., "Toyota Tacoma") to include specification identifiers for a Toyota Tacoma. For example, the application information may be utilized to access a catalogue to identify specification identifiers describing various specifications associated with Toyota Tacoma Trucks (e.g., tires, rims, electronics, etc.). At operation 126, the network-based marketplace 76 returns search results that include the listing 78 for "Goodyear Tires." The network-based marketplace 76 identifies the listing 78 as matched by comparing the specification identifiers derived from the query with the listing specification information 82 in the listing 78 and by comparing item information received in the query with the listing item information 80 in the listing 78.

According to a fourth aspect of the present disclosure systems and methods to supplement search results returned to a buyer of parts are described. Keywords may be received in a query from a buyer. The keywords may be analyzed to identify compatibility keywords in addition to item information that describes an item for which a buyer is searching a network-based marketplace. For example, the keywords may be analyzed based on catalogue information to identify whether the keywords may be application information and/or specification information. The application information may include keywords that describe an application that is compatible with the sought after item such that the item "fits" the application. For example, a buyer may desire a tire that fits a Toyota Tacoma truck and enter the query "Tires Toyota Tacoma." Accordingly, the keywords "Toyota Tacoma" may be identified as application information for the keyword "tires" that is inferred as item information. Further, the specification information may include keywords in the query that describe a specification for an item such that the item is compatible with an application that shares the specification. For example a user may enter the query "mouse USB male 2.0." In response to processing the query, one or more user interfaces may be generated that include listings that are supplemented with the compatibility keywords identified in the query. For example, a listing for "Goodyear Tires" may be supplemented with the string "For: Toyota Tacoma" responsive to a query for a "Goodyear tires" that further includes the keywords "Toyota Tacoma" (e.g., "Goodyear tires Toyota Tacoma.") As another example, a listing for a "Mouse" may be supplemented with the string "Specification: USB male 2.0" responsive to a query for a "Mouse" that further includes the keywords "USB male 2.0." (e.g., "Mouse USB male 2.0.")

Figure 9:
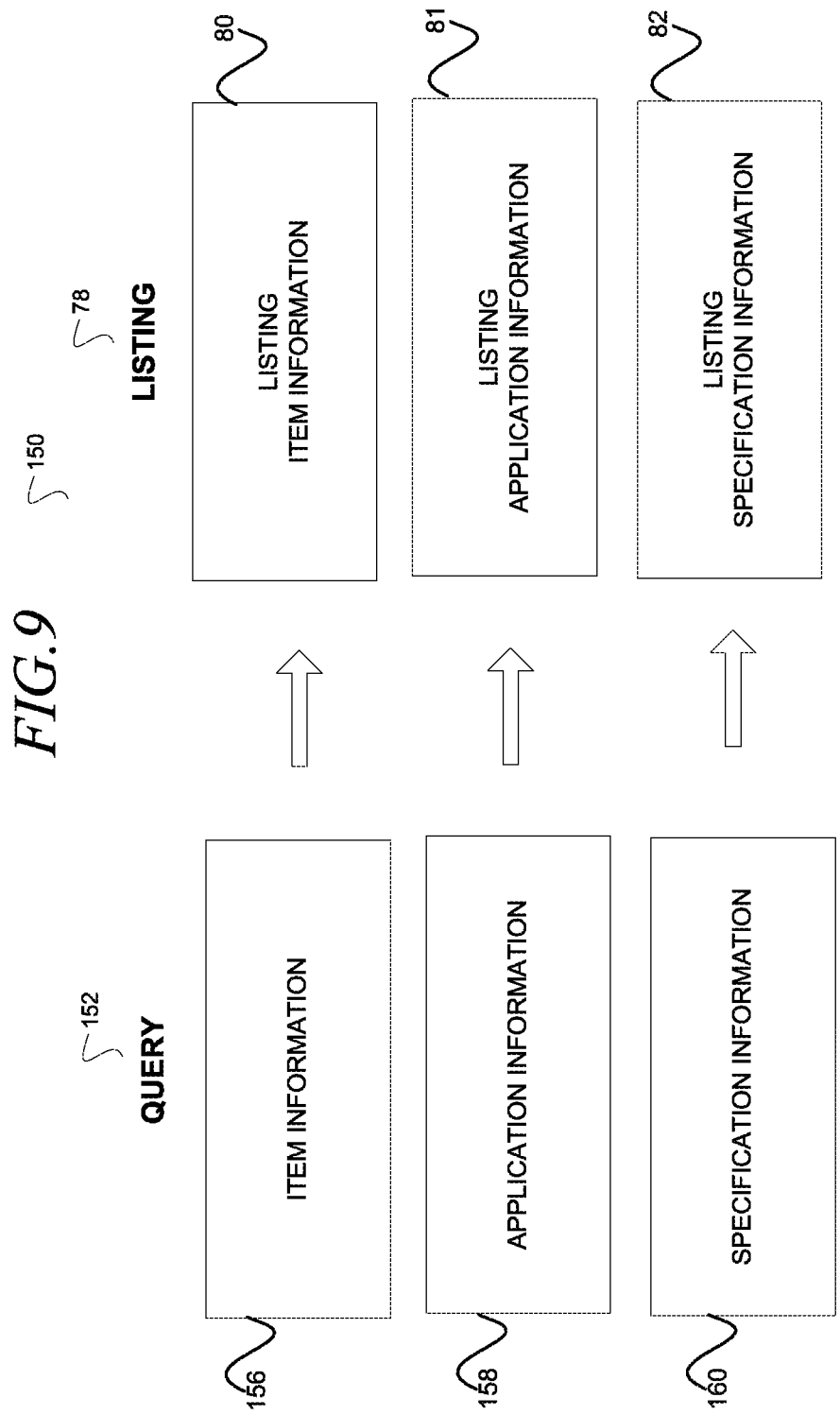
FIG. 9 is a block diagram illustrating a query and a listing, according to an embodiment.

FIG. 9 is a block diagram illustrating a relationship 150 between a query 152 and a listing 78. The methods and systems described herein may conform in practice to the relationship 150, described as follows. The query 152 may be received from a user (e.g., buyer) who is shopping on a network-based marketplace 76. The query may include keywords that may be identified (e.g., inferred) as item information 156 describing an item or part that is being sought on the network-based marketplace 76, application information 158 that may describe an application that is compatible with the part such that the part "fits" the application, and specification information 160 that may describe a specification for the part such that the part is compatible with an application that shares the same or related specification. The keywords in the query are used to search for listings 78 in a database. The listings 78 include listing item information 80 describing the item or part in the particular listing 78, listing application information 81 that may describe one or more application that are compatible with the item described in the listing 78, as previously described, and specification information 160 that may describe one or more specifications for the item in the listing, as previously described. A listing may be identified based on a comparison of like information. For example, the item information 156 in the query 152 may be compared with the listing item information 80 in the listing 78; the application information 158 in the query 152 may be compared with listing application information 81 in the listing 78; and the specification information 160 in the query 152 may be compared with the listing specification information 82 in the listing 78.

Figure 10:
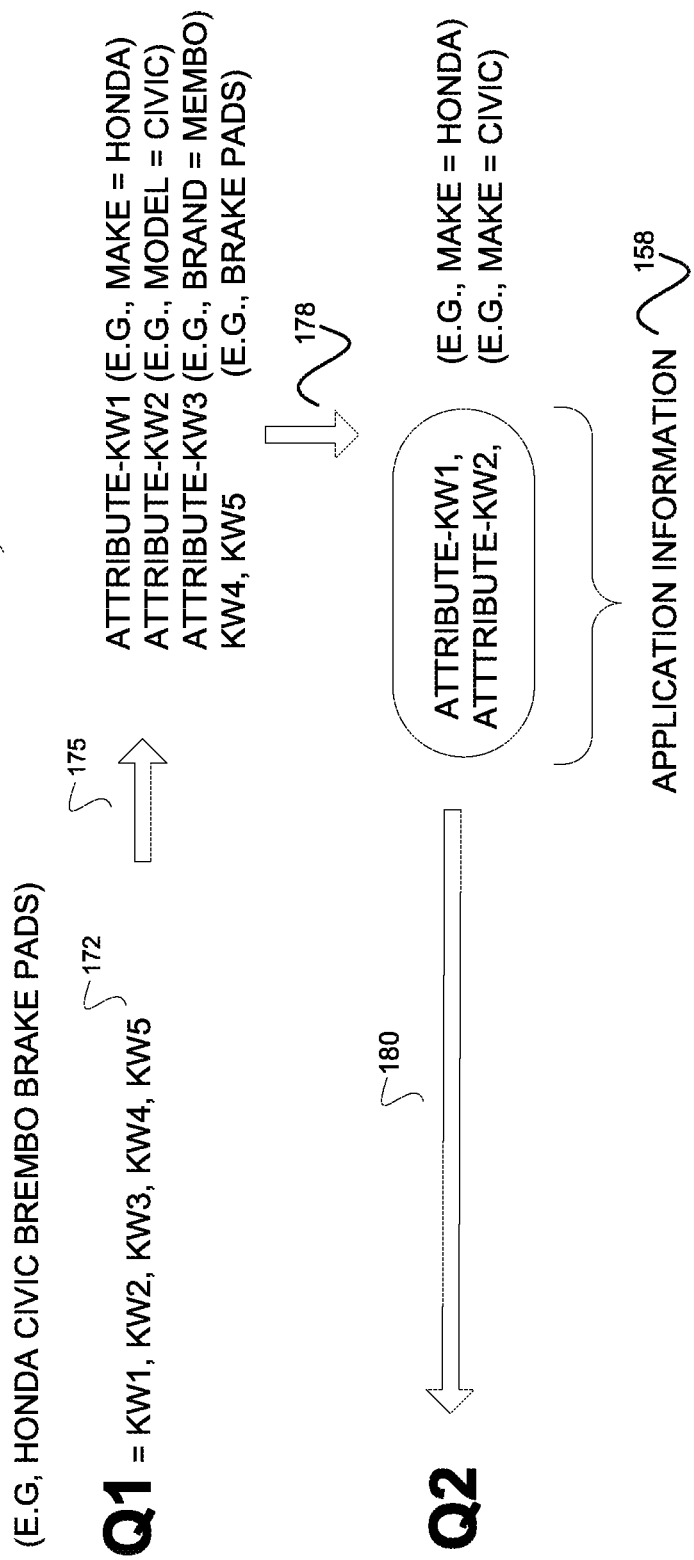
FIG. 10 is a block diagram illustrating a query construction, according to an embodiment.

FIG. 10 is a block diagram illustrating a query construction 170, according to an embodiment. The methods and systems described herein may conform to the query construction 170, described as follows. A keyword query 172 may be received at the network-based marketplace 76. The respective keywords may be associated, at operation 175, with attribute-keywords pairs. For example, the keywords "Honda," "Civic," and "Brembo" may be associated with attribute-keyword pairs. However, some keywords in the query may not be associated with attribute-keyword pairs. For example, the keywords "brake" and "pads" are not associated with attribute-keyword pairs. At operation 178, the attribute-keyword pairs may be grouped into application information 158. For example, the keywords "Honda" "Civic" may be identified as a rational group of attribute-keyword pairs constituting application information 158. Multiple groups in a single query may be identified as two distinct groups of application information. At operation 180 a query may be constructed based on the keywords received, the attribute-keyword pairs, and the application information, as illustrated in FIG. 11.

Figure 11:
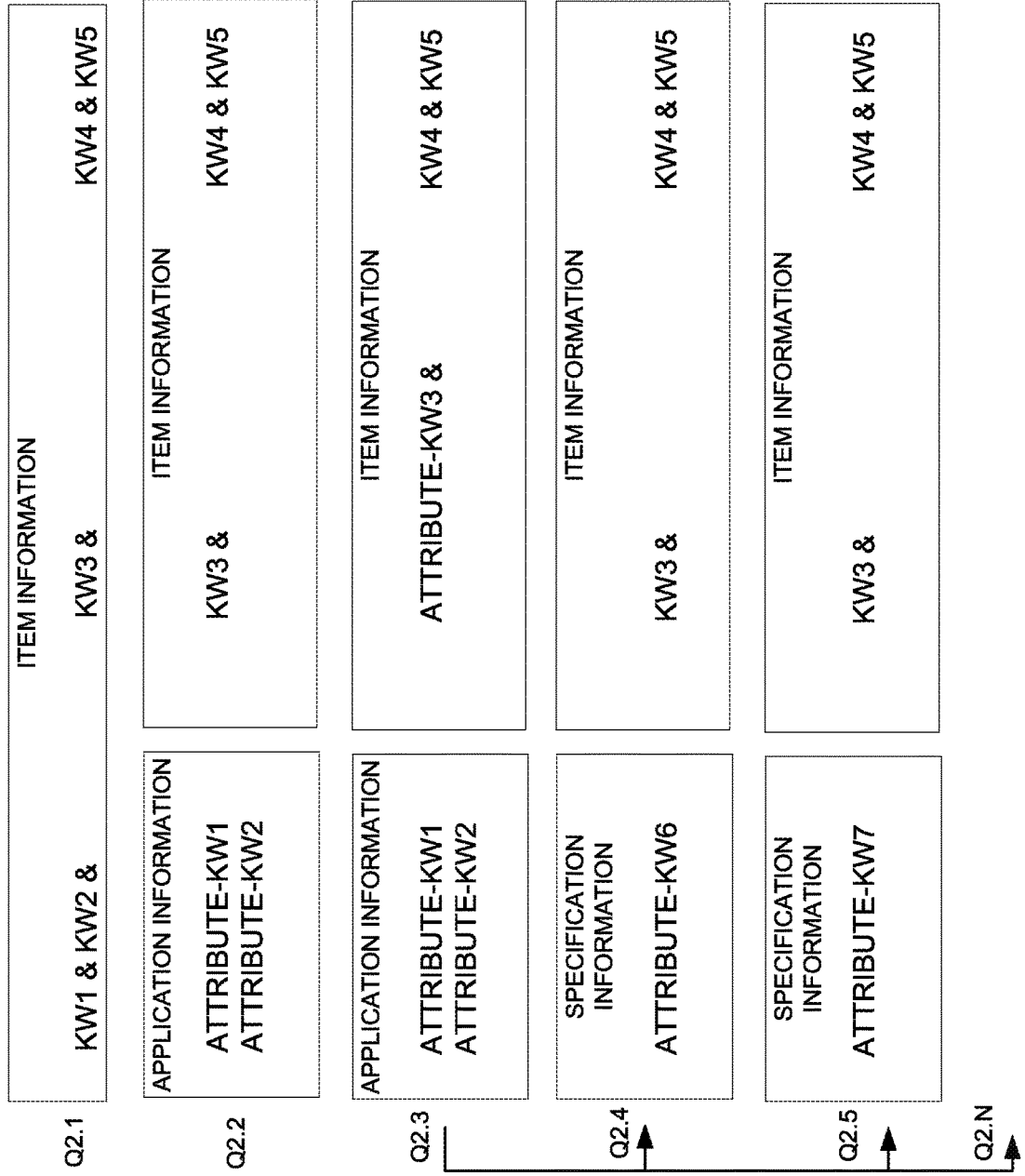
FIG. 11 is a block diagram illustrating a constructed query, according to an embodiment.

FIG. 11 is a block diagram illustrating a constructed query 181, according to an embodiment. The constructed query 181 may be executed as N logical queries Q2.1, Q2.2, Q2.3, Q2.4 and Q2.N where a listing that matches with any one of the queries constitutes a matched listing. Accordingly, the queries may be written with OR operators as follows: Q2.1|Q2.2|Q2.3|Q2.4|Q2.N.

The Q2.1 query may include the original keywords as item information 156 that are compared with unstructured listing item information 156 to identify whether the listing 78 is matched.

The Q2.2 query expands KW1 and KW2 keywords to application information 158 in the form of the attribute-keyword pairs ATTRIBUTE-KW1 and ATTRIBUTE-KW2. Accordingly, the KW3, KW4 & KW5 keywords continued to be compared with unstructured listing item information 80 in contrast with the attribute-keyword pairs KW1 and KW2 which are compared with the listing application information 81 to identify whether a listing 78 is matched.

The Q2.3 query expands the KW3 keyword to an attribute-keyword pair which nevertheless remains item information 156. Accordingly, the KW4 & KW5 keywords continued to be compared with unstructured listing item information 80, the ATTRIBUTE-KW3 is compared with structured listing item information 80, and the attribute-keyword pairs ATTRIBUTE-KW1 and ATTRIBUTE-KW2 are compared with the listing application information 81 to identify whether a listing 78 is matched.

The Q2.4 query expands the ATTRIBUTE-KW1 and ATTRIBUTE-KW2 to specification information 160 (e.g., specification identifier) in the form of the attribute-keyword pair ATTRIBUTE-KW6. For example, (MAKE=HONDA, MODEL=CIVIC) may be expanded to (SPECIFICATION=Bluetooth). Accordingly, the KW3, KW4 & KW5 keywords may be compared with unstructured listing item information 80, and the attribute-keyword pair ATTRIBUTE-KW6 may be compared with the listing specification information 82 to identify whether a listing 78 is matched.

The Q2.5 query expands the ATTRIBUTE-KW1 and ATTRIBUTE-KW2 to ATTRIBUTE-KW7, which is another specification for (MAKE=HONDA, MODEL=CIVIC). The comparisons are similar to Q2.4. It will be appreciated that the application information 158 (e.g., MAKE=HONDA, MODEL=CIVIC) may be expanded to N specification identifiers.

In general, the following rules may be observed: 1) original keywords or their respective expansions may be persevered; and 2) an expansion that converts one type of information (e.g., item information 156, application information 158, or specification information 160) to another type of information (e.g., application information 158 to specification information 160) may be followed in the comparison. Specifically, the item information 156 in the query 152 is compared with the listing item information 80 in the listing 78; the application information 158 in the query 152 is compared with listing application information 81 in the listing 78; and the specification information 160 in the query 152 is compared with the listing specification information 82 in the listing 78.

Figure 12:
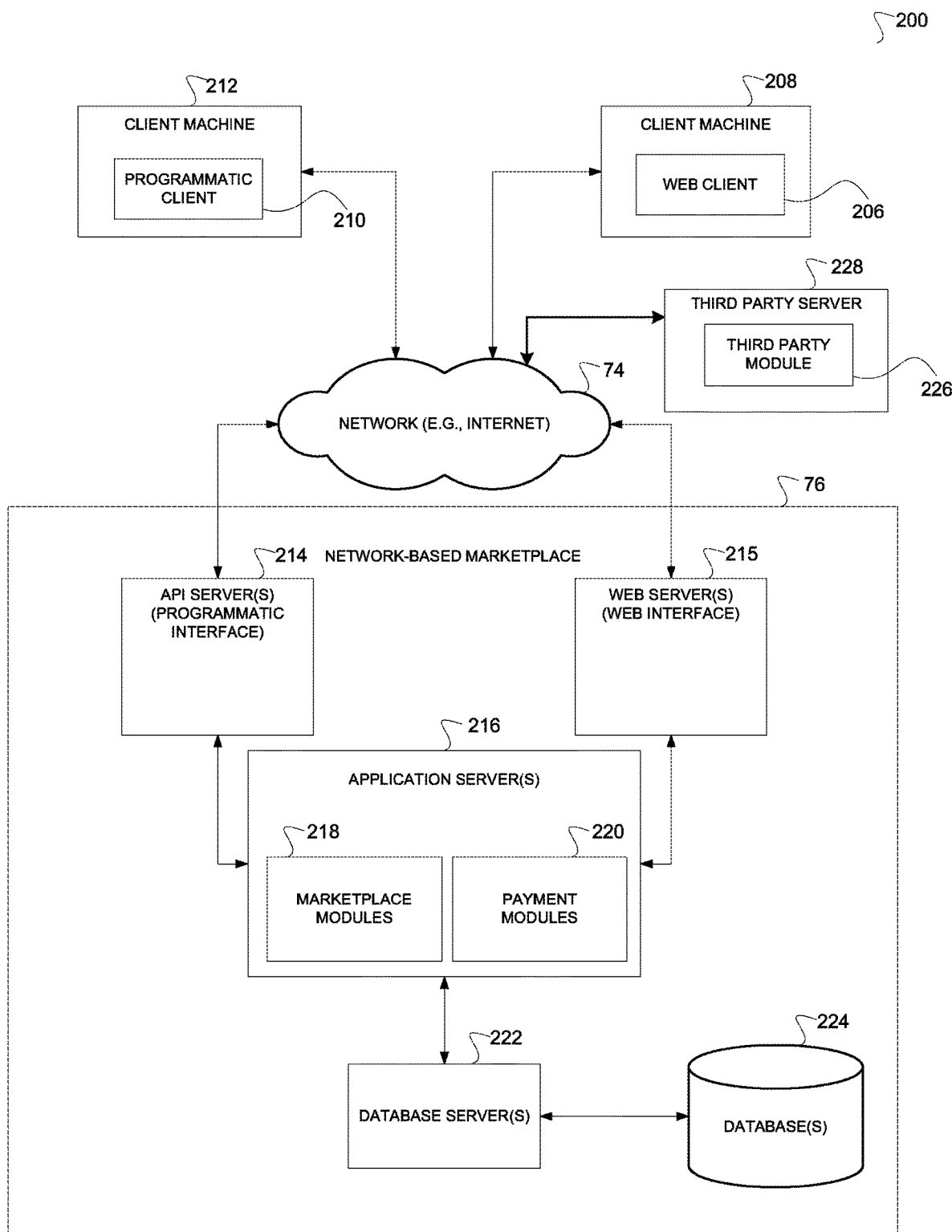
FIG. 12 is a block diagram illustrating a system, according to an embodiment, to execute the methods described herein.

FIG. 12 is a network diagram depicting a networked system 200, within which one example embodiment may be deployed. The system 200 corresponds to the systems 70, 90, and 110 in FIG. 6, FIG. 7, and FIG. 8, respectively. Accordingly, the same or similar references have been used to indicate the same or similar features unless otherwise indicated. A network-based marketplace 76 provides server-side functionality, via a network 74 (e.g., the Internet or Wide Area Network (WAN)) to one or more clients. FIG. 12 illustrates, for example, a web client 206 (e.g., a browser, such as the Internet Explorer browser developed by Microsoft Corporation of Redmond, Wash. State) executing on a client machine 208 and a programmatic client 210 executing on client machine 212.

An application program interface (API) server 214 and a web server 215 are coupled to, and provide programmatic and web interfaces respectively to, one or more application servers 216. The application servers 216 host one or more marketplace modules 218 and payment modules 220. The application servers 216 are, in turn, shown to be coupled to one or more database servers 222 that facilitate access to one or more databases 224.

The marketplace modules 218 may provide a number of marketplace functions and services to users that access the network-based marketplace 76. The payment modules 220 may likewise provide a number of payment services and functions to users. The payment modules 220 may allow users to accumulate value in accounts and then to later redeem the accumulated value for products (e.g., goods or services) that are made available via the marketplace modules 218. Value may be accumulated in a commercial currency, such as the U.S. dollar, or a proprietary currency, such as "points." While the marketplace modules 218 and payment modules 220 are shown in FIG. 12 to both form part of the network-based marketplace 76, it will be appreciated that, in alternative embodiments, the payment modules 220 may form part of a payment service that is separate and distinct from the network-based marketplace 76.

Further, while the networked system 200 shown in FIG. 12 employs a client-server architecture, embodiments of the present disclosure are of course not limited to such an architecture and could equally well find application in a distributed, or peer-to-peer, architecture system, for example. The various marketplace modules 218 and payment modules 220 could also be implemented as standalone software programs, which do not necessarily have networking capabilities.

The web client 206 and mobile programmatic client 210 access the various marketplace modules 218 and payment modules 220 via the web interface supported by the web server 215. Similarly, the programmatic client 210 accesses the various services and functions provided by the marketplace modules 218 and payment modules 220 via the programmatic interface provided by the API server 214. The programmatic client 210 may, for example, be a seller module (e.g., the TurboLister application developed by eBay Inc., of San Jose, Calif.) to enable sellers to author and manage listings on the network-based marketplace 76 in an off-line manner, and to perform batch-mode communications between the programmatic client 210 and the network-based marketplace 76.

FIG. 12 also illustrates a third party module 226, executing on a third party server machine 228, as having programmatic access to the networked system 200 via the programmatic interface provided by the API server 214. For example, the third party module 226 may, utilizing information retrieved from the network-based marketplace 76, support one or more features or functions on a website hosted by the third party. The third party website may, for example, provide one or more promotional, marketplace or payment functions that are supported by the relevant modules of the networked system 200.

Figure 13:
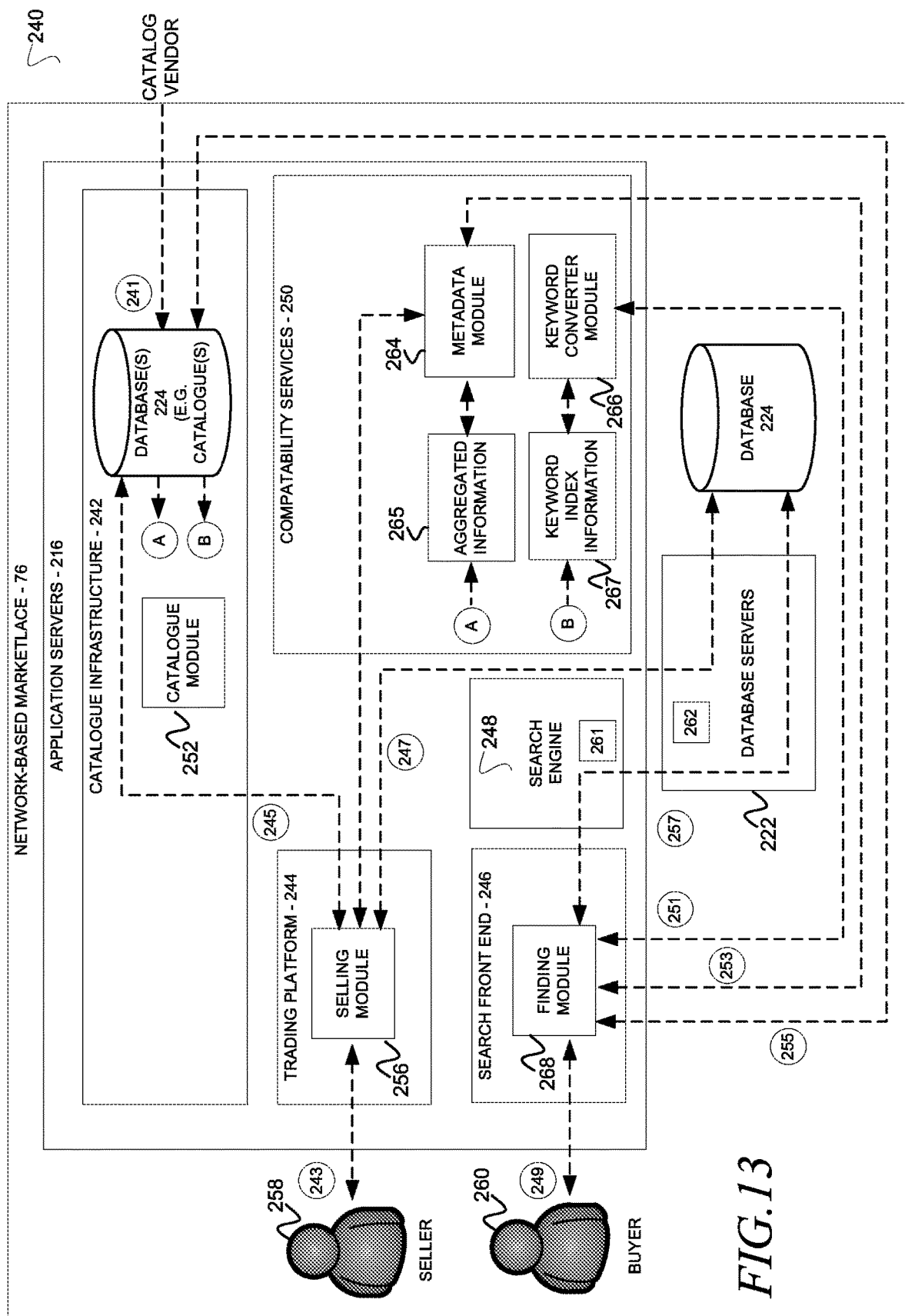
FIG. 13 is a block diagram illustrating a system, according to an embodiment, to execute the methods described herein.

FIG. 13 is a block diagram illustrating a system 240, according to an embodiment, to execute the methods described herein. The system 240 corresponds to the systems 70, 90, 110, and 200 in FIG. 6, FIG. 7, FIG. 8, and FIG. 12. Accordingly, the same or similar references have been used to indicate the same or similar features unless otherwise indicated. The system 240 is shown to include a network-based marketplace 76 including application servers 216 and database servers 222. The application servers 216 may support a catalogue infrastructure 242, a trading platform 244, a search front end 246, a search engine 248, and compatibility services 250. The catalogue infrastructure 242 may include a catalogue module 252 and data storage devices in the form of database(s) 224 to store multiple catalogues. The catalogues may include catalogue information describing products. Each catalogue may be directed at a specific domain of products (e.g., vehicles, tires, rims, computers, washing machines, etc.). The catalogue infrastructure 242 may be used to create and find listings of items (e.g., parts). The catalogue infrastructure 242 may be used to create listings by enabling a seller 258 to identify items (e.g., parts) as products. Responsive to identification, the listing may inherit or be painted with application identifiers that identify applications that are compatible with the identified product and specification identifiers that describe interfaces on the identified product that may be shared with applications. The catalogue infrastructure 242 may further be used to find listings 78 by enabling the association of application information 158 that is received in a query with specification information 160 in the form of specification identifiers that are then utilized to identify listings.

The trading platform 244 may include a selling module 256 that may be used to communicate with a seller 258 and with other components in the network-based marketplace 76 to create listings of items (e.g., parts) that may be sold or auctioned on the network-based marketplace 76. For example, the selling module 256 may be used to identify an item as a product. Responsive to the identification, the listing for the item may inherit or be painted with application identifiers that identify applications that are compatible with the identified product and specification identifiers that describe interfaces on the identified product that may be shared with applications. In addition, the selling module 256 may be used to receive application information for an item that cannot be identified as a product.

The search front end 246 includes a finding module 268 that may be used to communicate with a buyer 260 and other components in the network-based marketplace 76 to search for items (e.g., parts) on the network-based marketplace 76 for subsequent purchase or auction. For example, the finding module 268 may receive keywords in a query and process the query to retrieve listings from the database 224. The search engine 248 may be used to provide access to database servers 222 that, in turn, hosts a database module 262 that provides storage and retrieval services. For example, the search engine 248 may be used to store and retrieve listings of items from the database 224. The compatibility services 250 may be used to create and find listings of items based on catalogue information in the catalogues. For example, the compatibility services 250 may be used to associate keywords in the query with attribute-keyword pairs. Also for example, the compatibility services 250 may be used to identify groups of attribute-keywords as application information 158 describing an application and to associate such application information 158 with specification identifiers that are compatible with the application information 158. The compatibility services 250 may include a metadata module 264 and a keyword converter module 266. The keyword converter module 266 may be used to access keyword index information 267 to associate keywords with attribute-keyword pairs and the metadata module 264 may be used to access aggregated information 265 to identify groups of attribute-keyword pairs as application information 158.

Broadly speaking the system 240 may be described to operate as follows. At operation 241, the catalogue module 252 may receive catalogue information (e.g., catalogues) from catalogue vendors or some other source and store the catalogue information on the database 224. The catalogue module 252 may further process the catalogue information to generate the aggregated information 265 (e.g., A) and the keyword index information 267 (e.g., B) that are stored with the compatibility services 250. Accordingly, receipt of later versions of catalogue information from the catalogue vendors cause the catalogue information, aggregated information 265, and the keyword index information 267 to be updated.

At operation 243, the seller 258 may attempt to list an item (e.g., part) for sale on the network-based marketplace 76. At operation 245, the seller 258 may identify the item as a product by accessing the catalogue information via the catalogue module 252 with a product finder. Once found, the selling module 256 may retrieve specification identifiers and application identifiers for the product from the catalogue infrastructure 242. The specification identifiers may identify specifications for the part, and the application identifiers may describe applications that may be fitted with the part. At operation 247, the selling module 256 may create a listing in the database 224 by storing listing item information describing the part, application identifiers, and specification identifiers in the listing.

At operation 249, the buyer 260 may search for items (e.g., parts) for sale or auction on the network-based marketplace 76. For example, the buyer 260 may search for items by entering a query that includes keywords (e.g., "Honda Accord Alternator"). The keywords may include item information describing the item (e.g., "Alternator"), application information describing an application that may be fitted with the part (e.g., Honda Accord), and specification information describing specifications for the item. At operation 251, the keywords from the query may be communicated to keyword converter module 266 that, in turn, converts the keywords to attribute-value pairs based on the keyword index information 267 (e.g., MAKE=HONDA, MODEL=ACCORD, PART_TYPE=ALTERNATOR). At operation 253, the attribute-value pairs may be communicated to the metadata module 264 that, in turn, identifies groups of keyword-attribute pairs as application information (e.g., MAKE=HONDA, MODEL=ACCORD). At operation 255, the application information may be communicated to the catalogue module 252 to retrieve specification identifiers for the item (e.g., Alternator). Finally, at operation 257, the finding module 268 may invoke a search module 261 to retrieve matching listings from the database 224 based on the item information, the specification identifiers and the application identifiers.

Marketplace and Payment Modules

Figure 14:
FIG. 14 is a block diagram illustrating marketplace modules and payment modules, according to an embodiment.

FIG. 14 is a block diagram illustrating marketplace modules 218 and payment modules 220 (e.g., software applications) that, in one example embodiment, are provided as part of the networked system 200 of FIG. 12. The marketplace modules 218 and payment modules 220 may be hosted on dedicated or shared server machines, as shown in FIG. 12, that are communicatively coupled to enable communications between server machines. The modules themselves are communicatively coupled (e.g., via appropriate interfaces) to each other and to various data sources, so as to allow information to be passed between the modules or so as to allow the modules to share and access common data. The modules may furthermore access one or more databases 224 via the database servers 222, as shown in FIG. 12.

The network-based marketplace 76 may provide a number of publishing, listing and price-setting mechanisms whereby a seller may list (or publish information concerning) goods or services for sale; a buyer can express interest in or indicate a desire to purchase such goods or services; and a price can be set for a transaction pertaining to the goods or services. To this end, the marketplace and payment modules 218 and 220 are shown to include at least one publication module 280 and one or more auction modules 282 which support auction-format listing and price setting mechanisms (e.g., English, Dutch, Vickrey, Chinese, Double, Reverse auctions, etc.). The various auction modules 282 may also provide a number of features in support of such auction-format listings, such as a reserve price feature whereby a seller may specify a reserve price in connection with a listing, and a proxy-bidding feature whereby a bidder may invoke automated proxy bidding.

A number of fixed-price modules 284 may support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings and may allow a buyer to purchase goods or services, which are also being offered for sale via an auction, for a fixed-price that is typically higher than the starting price of the auction.

Store modules(s) 286 may allows a seller to group listings within a "virtual" store, which may be branded and otherwise personalized by and for the seller. Such a virtual store may also offer promotions, incentives and features that are specific and personalized to a relevant seller.

Reputation module(s) 288 may allow users that transact, utilizing the network-based marketplace 76, to establish, build and maintain reputations, which may be made available and published to potential trading partners. Consider, for example, that where the network-based marketplace 76 supports person-to-person trading, users may otherwise have no history or other reference information whereby the trustworthiness and credibility of potential trading partners may be assessed. The reputation module(s) 288 allow a user to establish a reputation within the network-based marketplace 76 over time, for example, through feedback provided by other transaction partners. Other potential trading partners may then reference such a reputation for the purposes of assessing credibility and trustworthiness.

Personalization modules 300 may allow users of the network-based marketplace 76 to personalize various aspects of their interactions with the network-based marketplace 76. For example a user may, utilizing appropriate personalization modules 300, create a personalized reference page at which information regarding transactions to which the user is (or has been) a party may be viewed. Further, the personalization modules 300 may enable a user to personalize listings and other aspects of their interactions with the networked system 200 and other parties.

The networked system 200 may support a number of marketplaces that are customized, for example, for specific geographic regions. A version of the networked system 200 may be customized for the United Kingdom, whereas another version of the networked system 200 may be customized for the United States. Some of these versions may operate as an independent marketplace, or may be customized (or internationalized) presentations of a common underlying marketplace. The networked system 200 may accordingly include a number of internationalization modules 302 that customize information (and/or the presentation of information) by the networked system 200 according to predetermined criteria (e.g., geographic, demographic or marketplace criteria). For example, the internationalization modules 302 may be used to support the customization of information for a number of regional websites that are operated by the networked system 200.

Navigation of the network-based marketplace 76 may be facilitated by one or more navigation modules 304. For example, browse modules may allow users to browse various category, catalogue, or inventory data structures according to which listings may be classified within the networked system 200. Various other navigation modules 304 may be provided to supplement the search and browsing modules.

In order to make listings available via the networked system 200 as visually informing and attractive as possible, the marketplace and payment modules 218 and 220 may include one or more imaging modules 306 with which users may upload images for inclusion within listings. The imaging modules 306 may also operate to incorporate images within viewed listings. The imaging modules 306 may also support one or more promotional features, such as image galleries that are presented to potential buyers. For example, sellers may pay an additional fee to have an image included within a gallery of images for promoted items.

Listing creation modules 308 may allow sellers to conveniently author listings of items (e.g., parts) pertaining to goods or services that they wish to transact via the network-based marketplace 76. For example, the listing creation modules 308 may include the previously mentioned selling module 256, as shown on FIG. 13, which may enable sellers to identify their items as products. The identification of an item as a product facilitates the association of specifications for the item in the listing and further facilitates the association of applications that are compatible with the item in the listing. The selling module 256 may further enable a seller to manually identify applications that are compatible with the item that is being listed. The listing management modules 310 may allow sellers to manage such listings. Specifically, where a particular seller has authored and/or published a large number of listings, the management of such listings may present a challenge. The listing management modules 310 may provide a number of features (e.g., auto-relisting, inventory level monitors, etc.) to assist the seller in managing such listings.

One or more post-listing management modules 312 may also assist sellers with a number of activities that may typically occur post-listing. For example, upon completion of an auction facilitated by one or more auction module(s) 282, a seller may wish to leave feedback regarding a particular buyer. To this end, the post-listing management modules 312 may provide an interface to one or more reputation module(s) 288, so as to allow the seller conveniently to provide feedback regarding multiple buyers to the reputation module(s) 288.

Dispute resolution modules 314 may provide mechanisms whereby disputes arising between transacting parties may be resolved. For example, the dispute resolution modules 314 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention modules 316 may implement fraud detection and prevention mechanisms to reduce the occurrence of fraud within the network-based marketplace 76.

Messaging modules 318 may be responsible for the generation and delivery of messages to users of the network-based marketplace 76, with such messages, for example, advising users regarding the status of listings at the network-based marketplace 76 (e.g., providing "outbid" notices to bidders during an auction process or providing promotional and merchandising information to users). Respective messaging modules 318 may utilize any one of a number of message delivery networks and platforms to deliver messages to users. For example, messaging modules 318 may deliver electronic mail (e-mail), instant message (IM), Short Message Service (SMS), text, facsimile, or voice (e.g., Voice over IP (VoIP)) messages via the wired network (e.g., the Internet), Plain Old Telephone Service (POTS), or wireless (e.g., mobile, cellular, WiFi (e.g., IEEE 802.11 technologies including 802.11n, 802.11b, 802.11g, and 802.11a)), Worldwide Interoperability for Microwave Access (e.g., WiMAX-IEEE 802.16) networks.

Retrieval modules 320 may support various searching functions that are made available to buyers to enable buyers to find listings. The retrieval modules 320 may for example include the previously mentioned finding module 268 and the search module 261, both as shown on FIG. 13. The finding module 268 may enable a buyer to enter queries that may be parsed to identify item information describing the sought after item, application information describing applications that are compatible with the item, and specifications for the item that may be shared with applications. The finding module 268 may further communicate the item information, application information, and specification information as a constructed query to the search module 261 to cause the search module 261 to search the database 224 to identify the appropriate listings.

The network-based marketplace 76 itself, or one or more parties that transact via the network-based marketplace 76, may operate loyalty programs that are supported by one or more loyalty promotions modules 324. For example, a buyer may earn loyalty or promotions points for transactions established and/or concluded with a particular seller, and then be offered a reward for which accumulated loyalty points can be redeemed.

The network-based marketplace 76 may further include compatibility modules 326 that may enable the identification of application information, specification information, and item information to facilitate the listing creation process for the seller and the listing search process for the buyer. For example, the compatibility modules 326 may include the previously mentioned catalogue modules 252, metadata module 264, and keyword converter module 266 as shown on FIG. 13.

Data Structures

Figure 15:
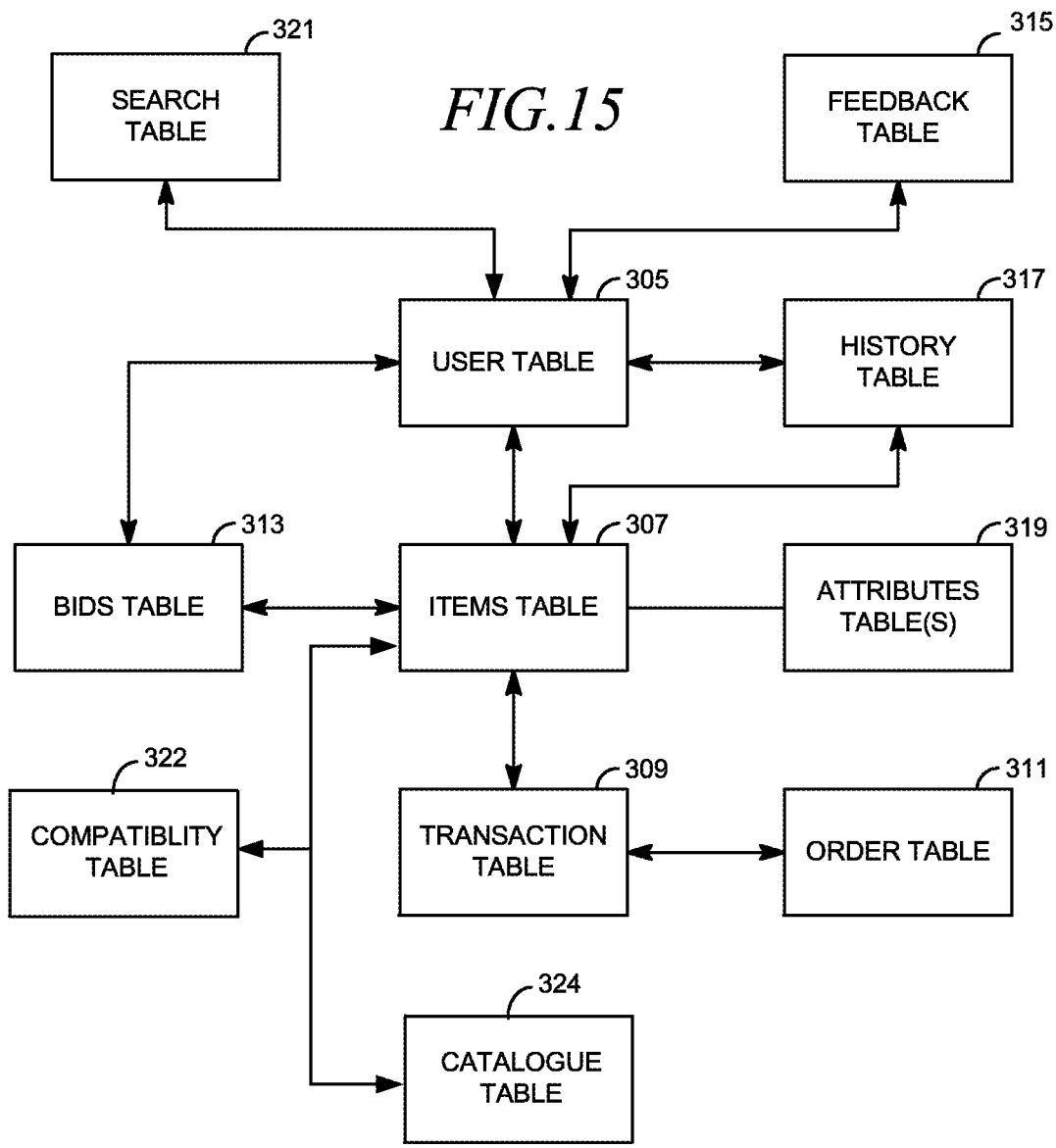
FIG. 15 is a block diagram illustrating tables, according to an embodiment.

FIG. 15 is a high-level entity-relationship diagram illustrating various tables 301 that may be maintained within the databases 224, and that are utilized by and support the marketplace modules 218 and payment modules 220. A user table 305 contains a record for registered users of the network-based marketplace 76. A user may operate as a seller, a buyer, or both, within the network-based marketplace 76. In one example embodiment, a buyer may be a user that has accumulated value (e.g., commercial or proprietary currency), and is accordingly able to exchange the accumulated value for items that are offered for sale by the network-based marketplace 76.

The tables 301 also include an items table 307 in which item records are maintained for goods (e.g., parts) and services that are available to be, or have been, transacted via the network-based marketplace 76. Item records within the items table 307 may furthermore be linked to one or more user records within the user table 305, so as to associate a seller and one or more actual or potential buyers with an item record.

A transaction table 309 contains a record for each transaction (e.g., a purchase or sale transaction) pertaining to items for which records exist within the items table 307.

An order table 311 may be populated with order records, with each order record being associated with an order. Each order, in turn, may be associated with one or more transactions for which records exist within the transaction table 309.

Bid records within a bids table 313 may relate to a bid received at the network-based marketplace 76 in connection with an auction-format listing supported by one or more auction modules 282, as shown in FIG. 14. A feedback table 315 may be utilized by one or more reputation modules 288, in one example embodiment, to construct and maintain reputation information concerning users. A history table 317 may be used to maintain a history of transactions to which a user has been a party. One or more attributes tables 319 record attribute information pertaining to items for which records exist within the items table 307. Considering only a single example of such an attribute, the attributes tables 319 may indicate a currency attribute associated with a particular item, with the currency attribute identifying the currency of a price for the relevant item as specified by a seller. A search table 321 may store search information that has been entered by a user (e.g., buyer) who is looking for a specific type of listing.

A compatibility table 322 may store aggregated information 265 and keyword index information 267 that has been generated from catalogues of products, as shown and discussed on FIG. 13. A catalogue table 324 may store catalogue information for multiple catalogues respectively for different types of products (e.g., automobiles, boats, washers, etc.).

Figure 16A:
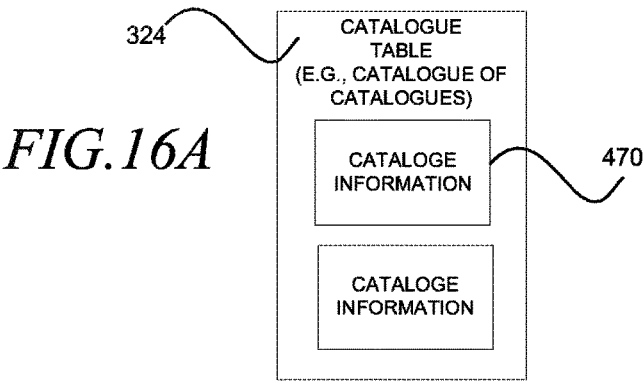
FIG. 16A is a block diagram illustrating a catalogue table, according to an embodiment.

FIG. 16A is a block diagram illustrating a catalogue table 324, according to an embodiment. The catalogue table 324 may include multiple entries of catalogue information 470 that respectively correspond to catalogues of products (e.g., vehicles, boats, washing machines, tires, rims, computers, etc.).

Figure 16B:
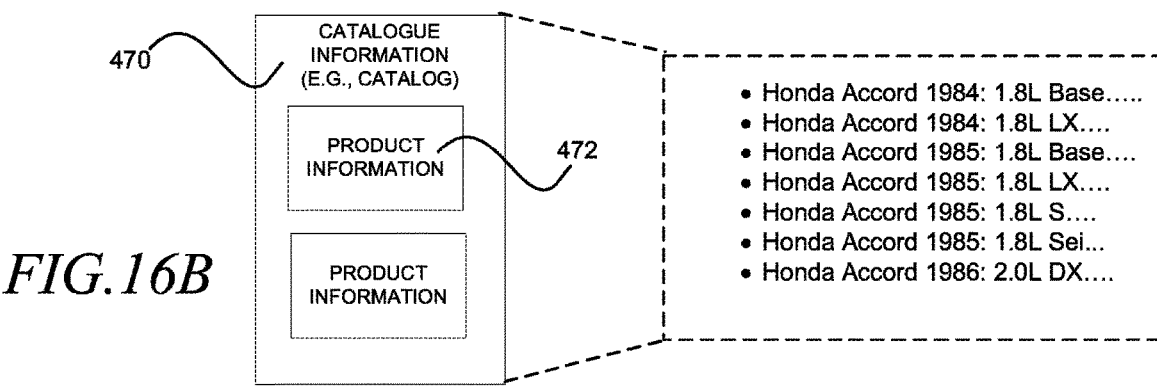
FIG. 16B is a block diagram illustrating catalogue information, according to an embodiment.

FIG. 16B is a block diagram illustrating catalogue information 470, according to an embodiment. The catalogue information 470 may include multiple entries of product information 472. Each entry of product information 472 may describe various aspects of a product.

Figure 16C:
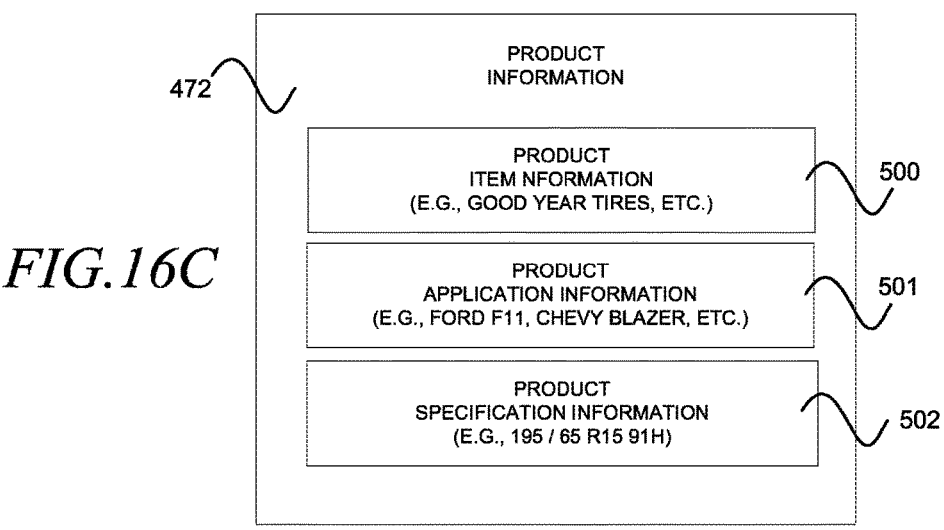
FIG. 16C is a block diagram illustrating product information, according to an embodiment.

FIG. 16C is a block diagram illustrating product information 472, according to an embodiment. The product information 472 may include product item information 500, product application information 501 and product specification information 502. The product item information 500 may describe the product. For example, product item information 500 may describe the product "Goodyear Tires." The product item information 500 may be embodied as structured information in the form of attribute-value pairs (e.g., PART_TYPE=brake pad) or unstructured information, as entered by the seller. The product application information 501 may include information that is descriptive of applications that are compatible with the product. The product specification information 502 may include specifications that are shared by the product and applications that are compatible with the product.

Figure 17A:
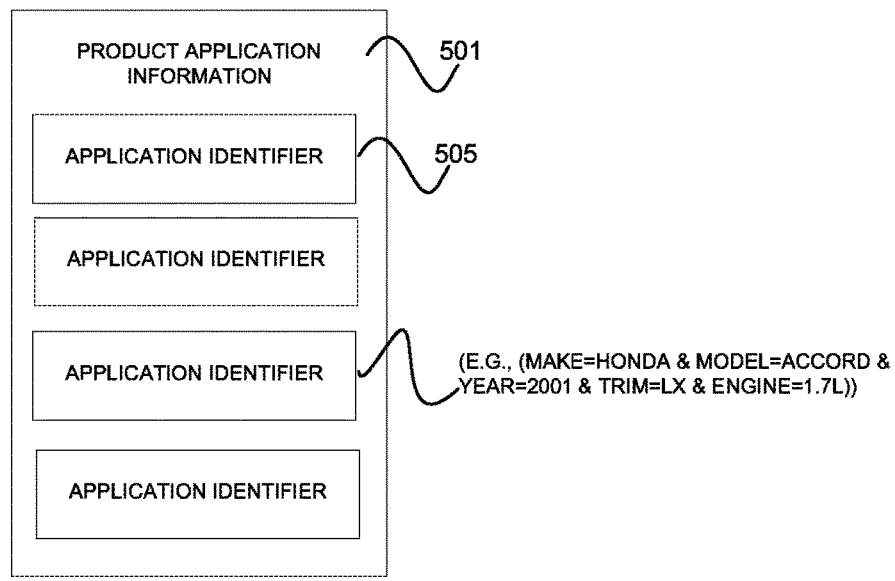
FIG. 17A is a block diagram illustrating product application information, according to an embodiment.

FIG. 17A is a block diagram illustrating product application information 501, according to an embodiment. The product application information 501 may include one or more application identifiers 505 that describe applications for which the product is compatible (e.g., product fits). For example, the application identifiers 505 for a product such as a tire may include a make, model, year, trim, engine size, or any other information that is descriptive of a particular automobile that is compatible with the product (e.g., tire).

Figure 17B:
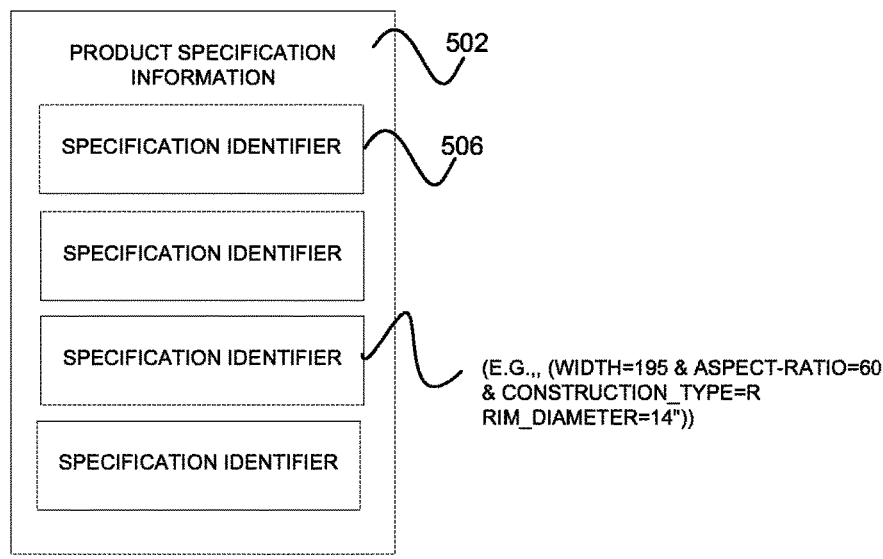
FIG. 17B is a block diagram illustrating product specification information, according to an embodiment.

FIG. 17B is a block diagram illustrating product specification information 502, according to an embodiment. The product specification information 502 may include specification identifiers 506 for the product. For example, one of the specification identifiers 506 for a product such as an automobile may include "195/65 R15 91 H" to specify a section width, aspect ratio, diameter, load index and speed index for a tire that fits the automobile. Other specifications for the automobile may include "Bluetooth 1.0" to specify an interface in the form of a wireless protocol for exchanging data over short distances between electronic components that operate within the vehicle or "V8" to specify an engine to power the vehicle, etc. Also for example, a specification identifier for a product such as a computer may include "USB female" to specify an interface for a cable that may be plugged into the computer or "Standard 101/102-key" or "Microsoft Natural PS/2" both specifying an interface for keyboards that are compatible with the computer.

FIG. 18A is a block diagram illustrating keyword index information 510, according to an embodiment. The keyword index information 510 may includes keywords 512 and attribute-keyword pairs 514. The keywords 512 may be received in a query or any other communication that is received by the network-based marketplace 76 and used to look up attribute-keywords pairs 514 associated with the keywords 512. The attribute-keyword pair 514 includes the keyword 512 utilized to look up the attribute-keyword pair 514 and an attribute. For example, the keyword 512 "Honda" may be associated with the attribute "MAKE" to form the attribute-keyword pair 514 "MAKE=HONDA." Also for example, the keyword 512 "chevy" may be associated with the attribute "MAKE" to form the attribute-keyword pair 514 "MAKE=CHEVROLET."

In one embodiment, the keyword 512 may be associated with one or more business rules to identify the associated attribute-keyword pair(s) 514. For example, the keyword "2002" may be associated with a business rule that identifies whether "BMW" also was received in the query. If identified, then "2002" is associated with the attribute-keyword pairs 514 "MODEL=2002" and "YEAR=2002" because BMWs are identified according to the model "2002" and the year "2002." Otherwise the keyword 512 "2002" may be associated only with the attribute-keyword pair 514 "YEAR=2002."

The keyword index information 510 may be generated from catalogue information 470 of one or more catalogues. For example, the keyword index information 510 may be generated from catalogues for automobiles, computers, washing machines, camping equipment, toys, or any other catalogue of products. The keyword index information 510 may further be periodically updated by the catalogue module 252 responsive to receipt of updated catalogue information 470.

FIG. 18B is a block diagram illustrating aggregated information 520, according to an embodiment. The aggregated information 520 may include aggregated information entries 522. Each aggregated information entry 522 may be a collection of dependent data as identified by the co-occurrence of the data in the catalogue information 470. For example, the values "HONDA" and "ACCORD" may be identified as repeatedly co-occurring in the catalogue information 470 thereby triggering the generation of an aggregate information entry 522 including both the values "HONDA" and "ACCORD." In one embodiment the aggregate information entry 522 may be embodied as a collection of attribute-value pairs. For example, an aggregated information entry 522 may include the attribute-value pairs "YEAR=2008→MAKE=VOLKSWAGEN→MODEL= PASSAT→ENGINE=V6-3597→ENGINE_SIZE=3.6 L, etc" because the values "2008," "VOLKSWAGEN," "PASSAT", and "V6-3597" were found to co-occur in the catalogue information 470 for automobiles.

Figure 19:
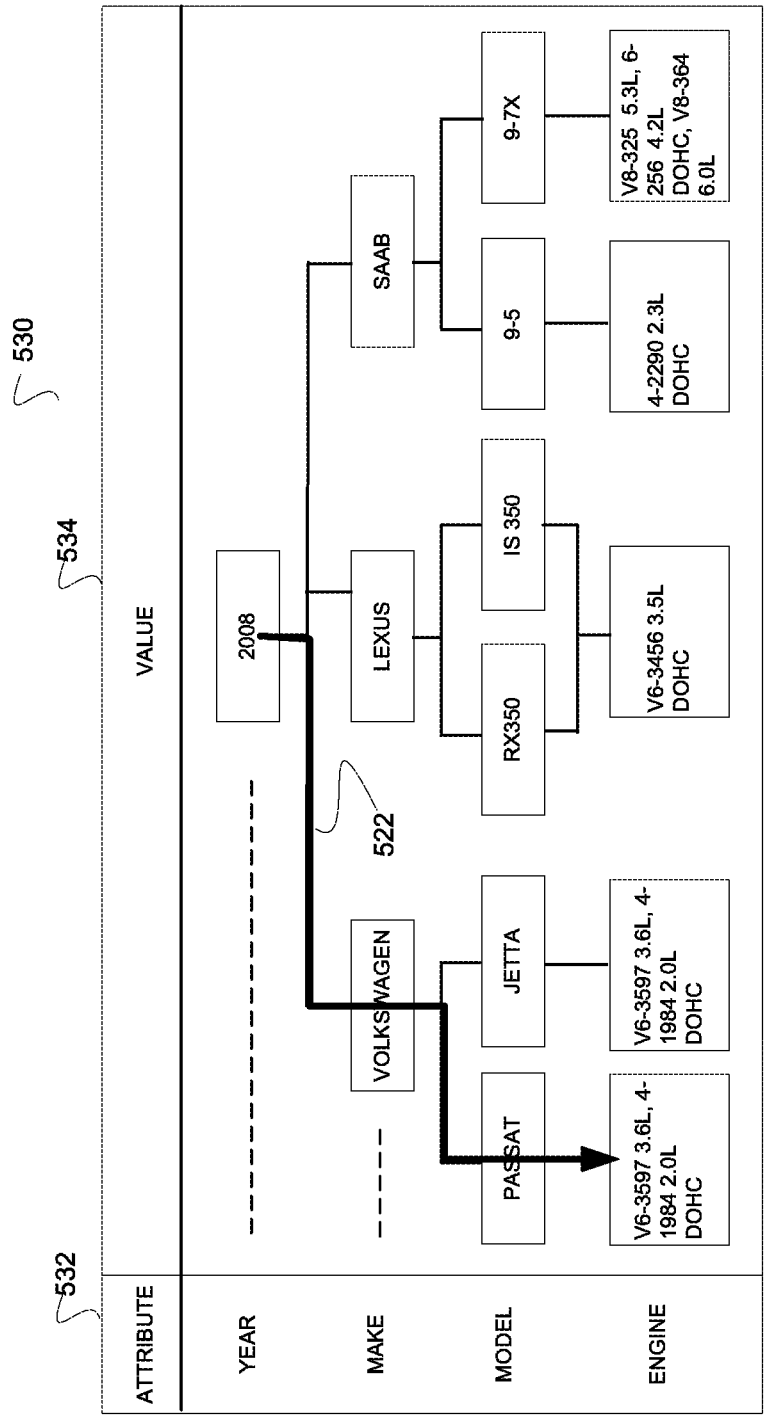
FIG. 19 is a block diagram illustrating a dependency graph, according to an embodiment.

FIG. 19 is a block diagram further illustrating a dependency graph 530, according to an embodiment. The dependency graph 530 illustrates relationships between data stored in catalogue information 470. The dependency graph 530 may be generated by the catalogue module 252 from the catalogue information 470 and be utilized to generate the keyword index information 267 and the aggregated information 520, as described above. For example, the catalogue information 470 for automobiles may include data that may be normalized to generate the values 534 illustrated in the dependency graph 530. The values 534 may further be assigned attributes 532, as illustrated. It may be observed that one or more values 534 may correspond to a particular attribute 532. An aggregate information entry 522 may be generated by proceeding down the attributes 532 (e.g., year, make, model, and engine) and collecting a value 534 for each attribute 532.

Figure 20A:
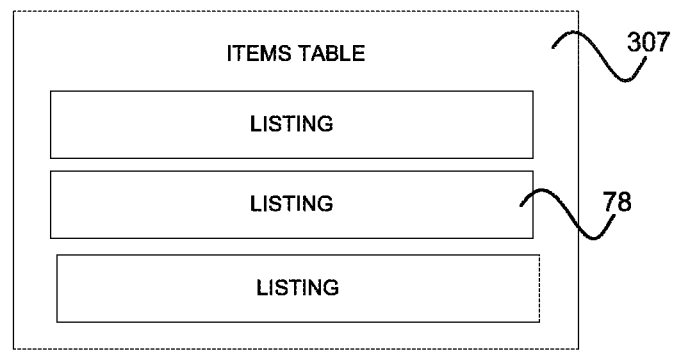
FIG. 20A is a block diagram illustrating an items table, according to an embodiment.

FIG. 20A is a block diagram illustrating an items table 307, according to an embodiment. The items table 307 may include multiple listings 78 that are respectively used by sellers to list items (e.g., parts) for sale on the network-based marketplace 76.

Figure 20B:
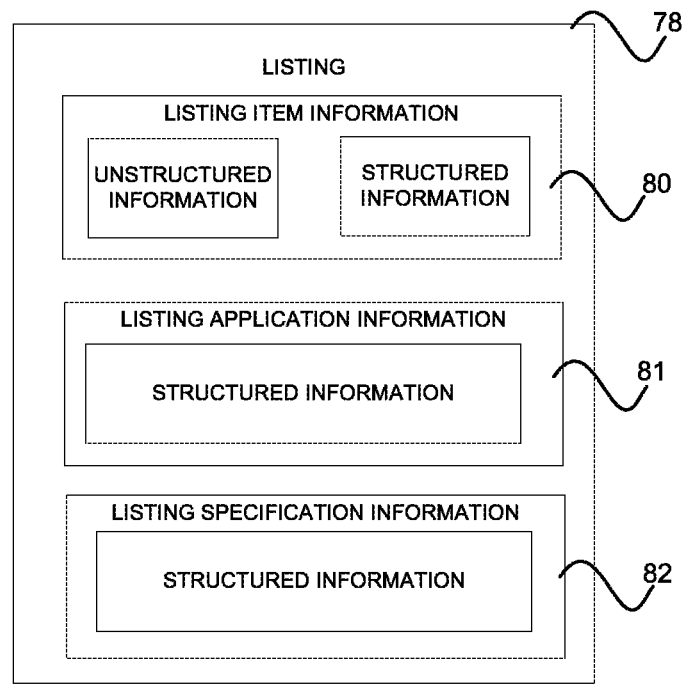
FIG. 20B is a block diagram illustrating a listing, according to an embodiment.

FIG. 20B is a block diagram illustrating a listing 78, according to an embodiment. The listing 78 may be created by a seller to sell an item (e.g., part) on the network-based marketplace 76. The listing 78 may include listing item information 80, listing application information 81 and listing specification information 82. The listing item information 80 may describe the item that the seller is selling. The listing item information 80 may be received directly from the seller who is unfettered in their choice of information and stored as unstructured information. The listing item information 80 may further include information that has been structured (e.g., structured information) from the unstructured information. In one embodiment the structured information may include attribute-value pairs (e.g., MAKE=HONDA, YEAR=2002). The network-based marketplace 76 may parse the unstructured information in the listing item information 80 to generate and store the structured information in the listing item information 80. For example, the user or seller may enter the phrase "brake pad," and the network-based marketplace 76, in turn, may structure "brake pad" as PART_TYPE="brake pad."

The listing application information 81 may describe one or more applications that are compatible with the item or part the seller is selling such that the item or part fits that application. For example, the seller may be selling brake pads, and the listing application information 81 may identify Honda Civics for the years 2001-2007 as applications that are compatible with the proffered brake pads. The listing application information 81 may be stored as structured information.

Figure 31:
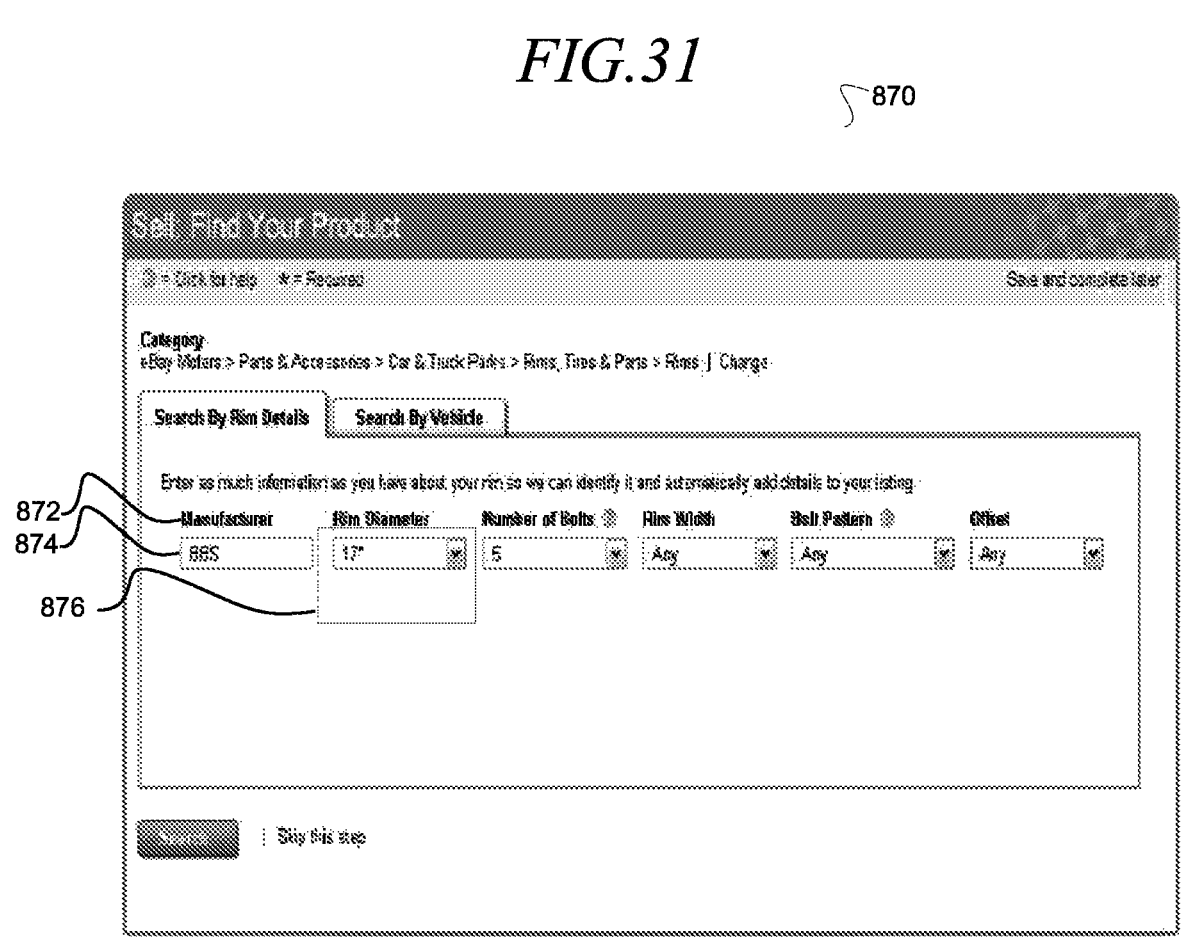

The listing application information 81 may be identified and stored responsive to the seller identifying the item as a product. For example, the seller may utilize a product finder to identify the item that is being sold via the listing 78 as a product. FIG. 31 is a diagram illustrating a user interface to find a rim product (e.g., product finder), according to an embodiment. The user may enter the manufacturer, rim diameter, number of bolts, rim width and other information to identify the item (e.g., rim) they are selling as a product. For example, the information received from the seller may be utilized to identify a product matching a part (e.g., rim) that the seller is listing for sale. Responsive to identification of the product in a catalogue for rims, the product application information 501 associated with the product may be stored as listing application information 81 in the listing 78. For example, the listing application information 81 may include automobiles that are compatible with the rims being sold such that the rims may be fitted to the automobile.

Figure 30:
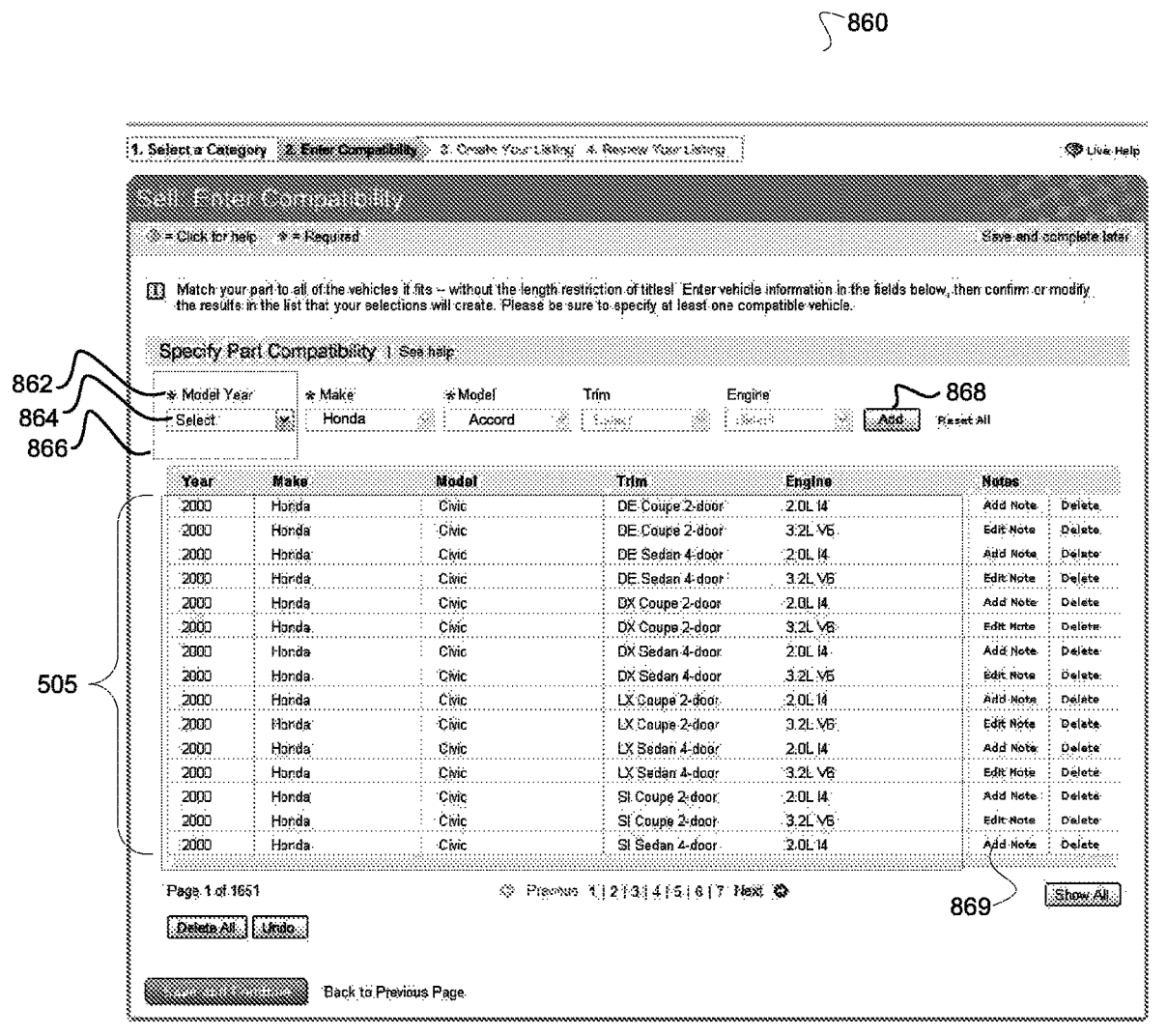

The listing application information 81 may also be identified in the absence of the seller identifying the item as a product. For example, the network-based marketplace 76 may receive multiple values from a seller that describe an application that is compatible with the item (e.g., part) being sold by the seller. For example, FIG. 30 is a diagram illustrating a user interface 860 to identify compatibility for a part, according to an embodiment. The user interface 860 may be used to receive values that may be used to identify applications that are compatible with the item that is being sold. For example, a user may enter values for a make, model, and year for an automobile. Responsive to receiving these values the network-based marketplace 76 may search catalogue information based on the values to identify matching applications. For example, the values MODEL=ACCORD and MAKE=HONDA may be used to access the catalogue information 470 to retrieve all the permutations of HONDA ACCORD registered in the catalogue information 470 as application identifiers 505 notwithstanding the year, trim, fuel or engine types. Next, the identified application identifiers 505 may be stored as listing application information 81 in the listing 78.

The listing specification information 82 may describe one or more specifications for the item or part the seller is selling. The specification may describe "how" the item or part fits to an application. For example, the seller may be selling rims, as previously mentioned, and the listing specification information 82 may include the specifications for the rims. The listing specification information 82 may be stored as structured information (e.g., attribute-value pairs). The listing specification information 82 may be identified and stored in the listing 78 responsive to the seller identifying the item as a product. As previously described, responsive to identification of the product in a catalogue with a product finder (e.g., FIG. 30), the product specification information 160 associated with the product may be stored as listing specification information 82 in the listing 78.

Figure 20C:
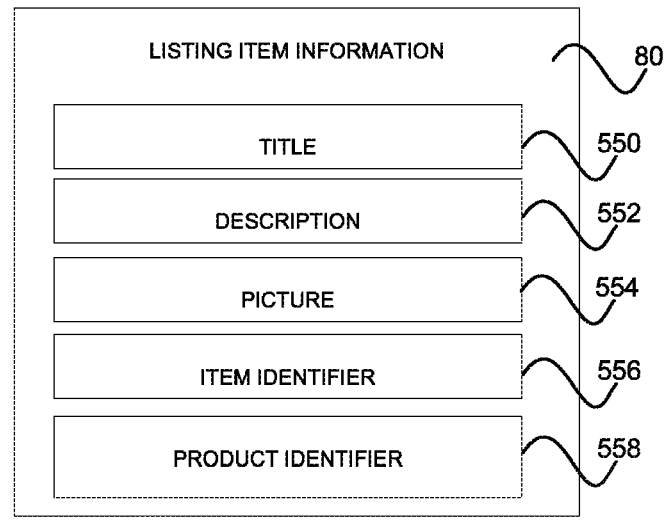
FIG. 20C is a block diagram illustrating listing item information, according to an embodiment.

FIG. 20C is a block diagram illustrating listing item information 80, according to an embodiment. The listing item information 80 may describe the item (e.g., part) that is featured in the listing 78. The listing item information 80 may include a title 550 that may include alphanumeric text, a description 552 that may include alphanumeric text, a picture 554 of the item or part, an item identifier 556 that uniquely identifies the listing from other listings and a product identifier 558. The listing item information 80 may be stored as structured or unstructured information.

Figure 21A:
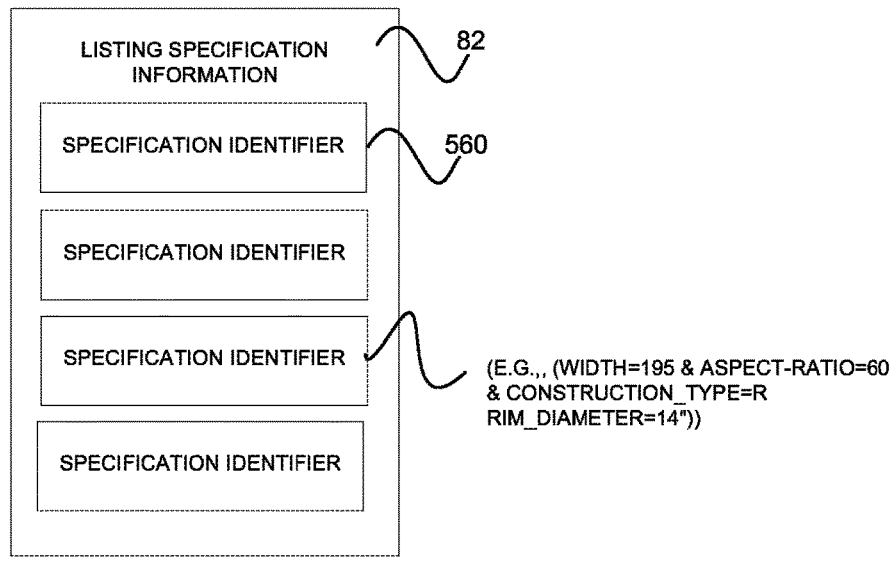
FIG. 21A is a block diagram illustrating listing specification information, according to an embodiment.

FIG. 21A is a block diagram illustrating listing specification information 82, according to an embodiment. The listing specification information 82 may have been inherited from product specification information 160, according to one embodiment, in response to a seller identifying the item (e.g., part) as a product. The listing specification information 82 may include one or more specification identifiers 560 that respectively describe specifications for the item. For example, a mouse may be associated with a USB-MALE specification that describes how the mouse connects to a computer. Each specification identifier 560 may include one or more attribute-value pairs. For example, a specification identifier 560 for a tire may include the following attribute-value pairs: WIDTH=195 & ASPECT_RATIO=60 & CONSTRUCTION_TYPE=R RIM_DIAMETER=14.

Figure 21B:
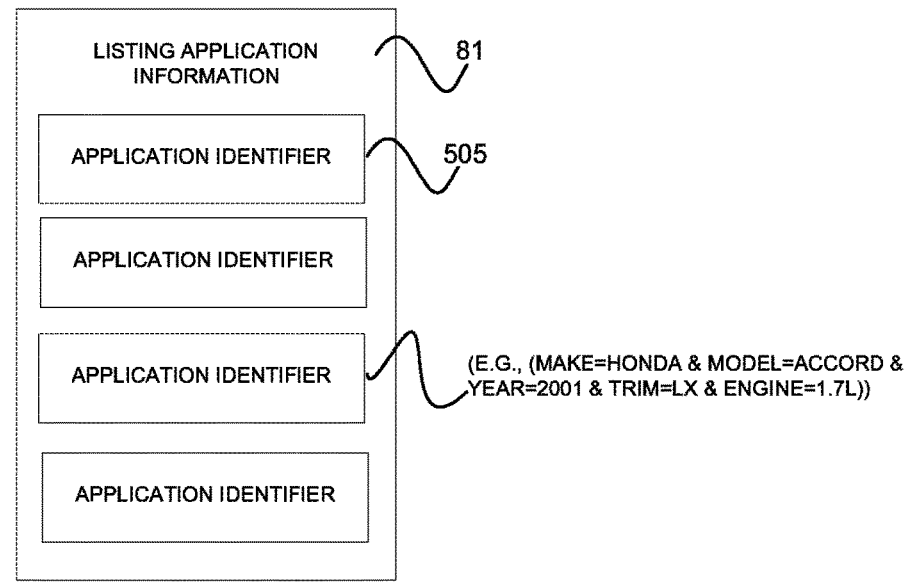
FIG. 21B is a block diagram illustrating listing application information, according to an embodiment.

FIG. 21B is a block diagram illustrating listing application information 81, according to an embodiment. The listing application information 81 may have been inherited from product application information 501, according to one embodiment, in response to a seller identifying the item (e.g., part) as a product. The listing application information 81 may describe applications that are compatible with the item (e.g., part). The listing application information 81 may include one or more application identifiers 505. For example, a listing for a part in the form of a rim may fit applications in the form of a Honda Accord, a Toyota Camry, or a Ford Taurus, respectively described by different application identifiers 505. Each application identifier 505 may include one or more attribute-value pairs, as described more fully below.

Figure 22A:
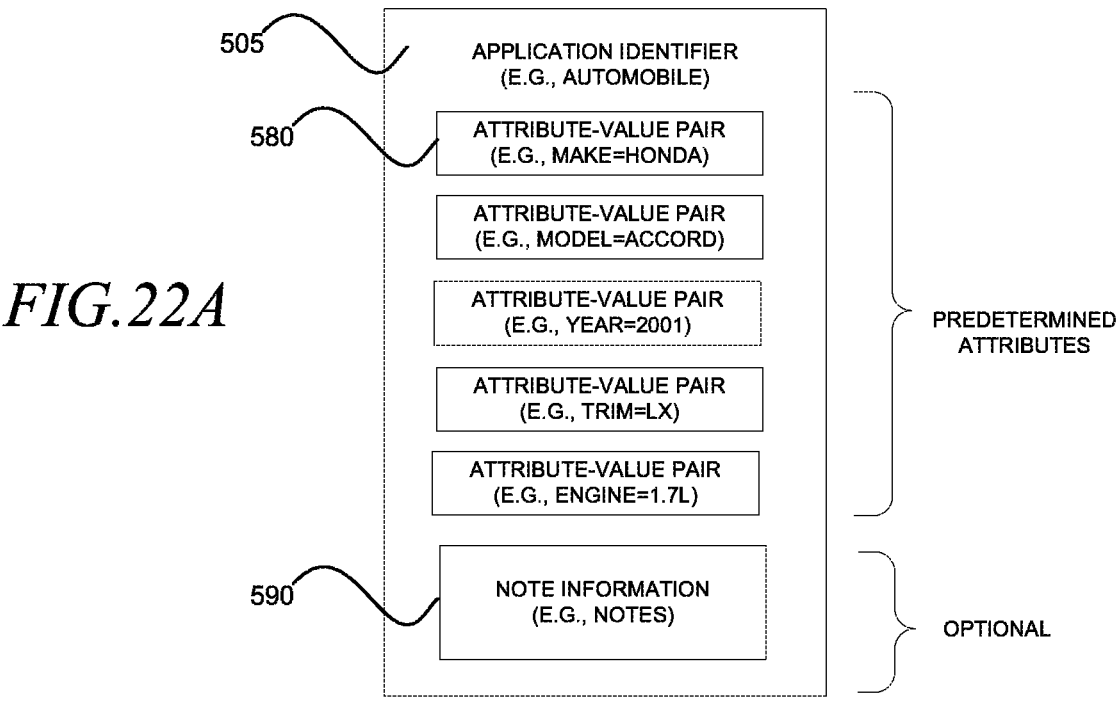
FIG. 22A is a block diagram illustrating an application identifier, according to an embodiment.

FIG. 22A is a block diagram illustrating an application identifier 505, according to an embodiment. The application identifier 505 may include attribute-value pairs 580 that are predetermined, and note information 590 that is optional. The attribute-value pairs 580 are predetermined with respect to the quality and number of attributes. For example, the domain of vehicles may be associated with a predetermined number of attribute-value pairs 580 equal to five, and the predetermined attributes may include a make, a model, a year, a trim and an engine. Also for example, the domain of tires may be associated with a predetermined number of attribute-value pairs 580 equal to four with the predetermined attributes including a width, an aspect-ratio, a construction type and a rim diameter.

The note information 590 may further be included for items to enable buyers to determine compatibility. The note information 590 may include an attribute-value pair 580 or alphanumeric text. For example, consider an item for sale in the form of a bed liner for a truck that is identified in the catalogue information 470 as a bed liner product. Further consider that the bed liner product is associated with product application information 501 that includes multiple application identifiers 505 identifying applications (e.g., trucks) that are compatible with the bed liner. In this case, the previously mentioned predetermined attributes for vehicles including make, model, year, trim and engine and bed size may be insufficient to determine whether the bed liner and the trucks are compatible. Accordingly, in such instances, the product application information 501 may further include note information 590 in the form of one or more attribute-value pairs 580 or alphanumeric text. For example, the optional attribute-value pair 580 may be initialized with the additional information (e.g., BED_SIZE=6FEET) or the string "requires a bed size of 6 feet." Accordingly, the application identifier 505 may be subsequently utilized by buyers to identify whether the particular item exhibits a desired compatibility.

Figure 22B:
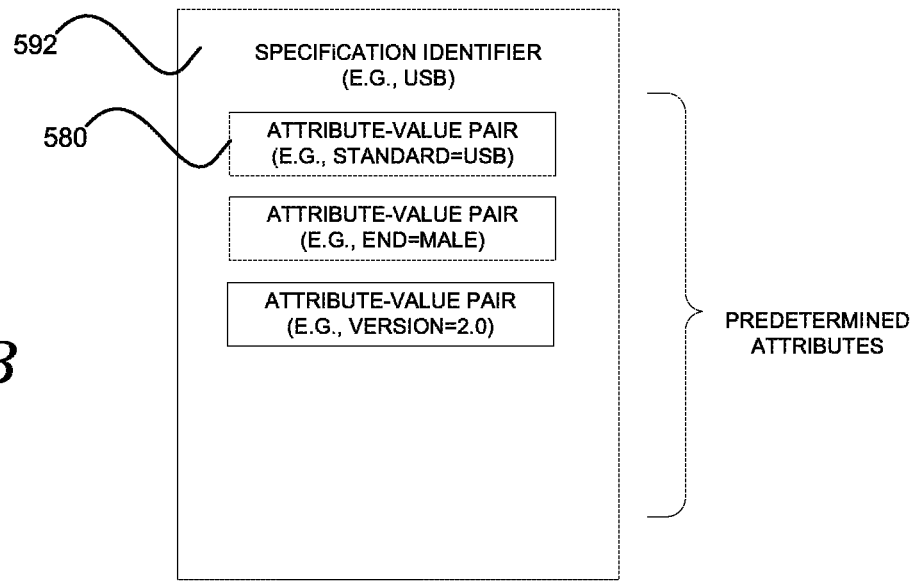
FIG. 22B is a block diagram illustrating a specification identifier, according to an embodiment.

FIG. 22B is a block diagram illustrating a specification identifier 592, according to an embodiment. The specification identifier 592 may include attribute-value pairs 580 that are predetermined. The attribute-value pairs 580 are predetermined with respect to the quality and number of attributes. For example, the domain of computer cables may be associated with a predetermined number of attribute-value pairs 580 equal to three with the predetermined attributes including a standard, an end (e.g., male or female), and a version.

FIG. 23 is a flow chart illustrating a method 600 to initialize a data source (e.g. database) based on a compatibility with an application, according to an embodiment. Operations on the left are performed by a client machine 208 and operations on the right are performed by a network-based marketplace 76. The method 600 commences at operation 602 with the client machine 208 communicating item information to the network-based marketplace 76. The application may include computers, washing machines, lawn mowers, scooters, buildings, doors, tractors, solar panels, bikes, airplanes, aircrafts, motorcycles, boats, or any other application that may be assembled from parts. For example, a user may be a seller who is selling brake pads and the application may include an automobile. At operation 604, the selling module 256 receives the item information.

At operation 606, the seller at the client machine 208 communicates product search information to identify a product for the brake pad that is being listed. The user may want to identify the brake pad as a product to identify applications in the form of vehicles that are compatible with the brake pad or specifications that describe an interface that are compatible with the brake pad. For example, according to one embodiment, the user may utilize a product finder (e.g., FIG. 30) to identify the "brake pad" as a product. At operation 608, the selling module 256 may receive the product search information, and at operation 610 the selling module 256 may accesses the appropriate catalogue information 470 (e.g., catalogue) based on the search information to identify that the product is not in the product catalogue.

At operation 612, the seller at the client machine 208 may request a user interface to manually configure a compatibility with an application (e.g., a fitment). For example, the user may want to describe vehicles that are compatible with the brake pad that the user is listing on the network-based marketplace 76. At operation 614, the selling module 256 may receive the request and communicate a user interface to the seller at the client machine 208. For example, the selling module may communicate the user interface 860, as illustrated in FIG. 30.

Returning to FIG. 23, at operation 616, the seller may select values from the user interface to identify vehicles that are compatible with the brake pad. For example, the seller may utilize a pull down menu to select a value "HONDA" for a predetermined attribute in the form of a vehicle make, a value "ACCORD" for a predetermined attribute in the form of model, and a value "LX" for a predetermined attribute in the form of trim.

At operation 618, the selling module 256 may receive the application information including the values associated with predetermined attributes and note information entered by the seller. For example, the seller may enter a note in the form of an alphanumeric string describing the brake pad as only fitting an "alloy rim."

At operation 620, the catalogue module 252 may identify application identifiers 505 based on the application information received from the seller including the selected values "HONDA," "ACCORD," and "LX." For example, the selling module 256 may communicate a request to the catalogue module 252 to identify all vehicles that match "MAKE=HONDA" and "MODEL=ACCORD." In response to the request, the catalogue module 252 may retrieve and communicate application identifiers 505 for all products (e.g., vehicles) that match "MAKE=HONDA" and "MODEL=ACCORD." For example, the catalogue module 252 may return the following application identifiers 505:
MAKE=HONDA, MODEL=ACCORD, YEAR=2002, TRIM=LX, ENG=1.7
MAKE=HONDA, MODEL=ACCORD, YEAR=2003, TRIM=LX, ENG=1.6
MAKE=HONDA, MODEL=ACCORD, YEAR=2003, TRIM=LX, ENG=1.7
MAKE=HONDA, MODEL=ACCORD, YEAR=2004, TRIM=LX, ENG=1.7

At operation 622, the finding module 268 may append the note information that was received from the seller to each of the retrieved application identifiers 505 and communicate the application identifiers 505, as modified, to the database module 262 for storage as listing application information 81 in a listing 78 in the database 224.

At operation 624, the finding module 268 may further communicate the item information 156 received from the seller to the database module 262 for storage as listing item information 80 in a listing 78 in the database 224.

Figure 24:
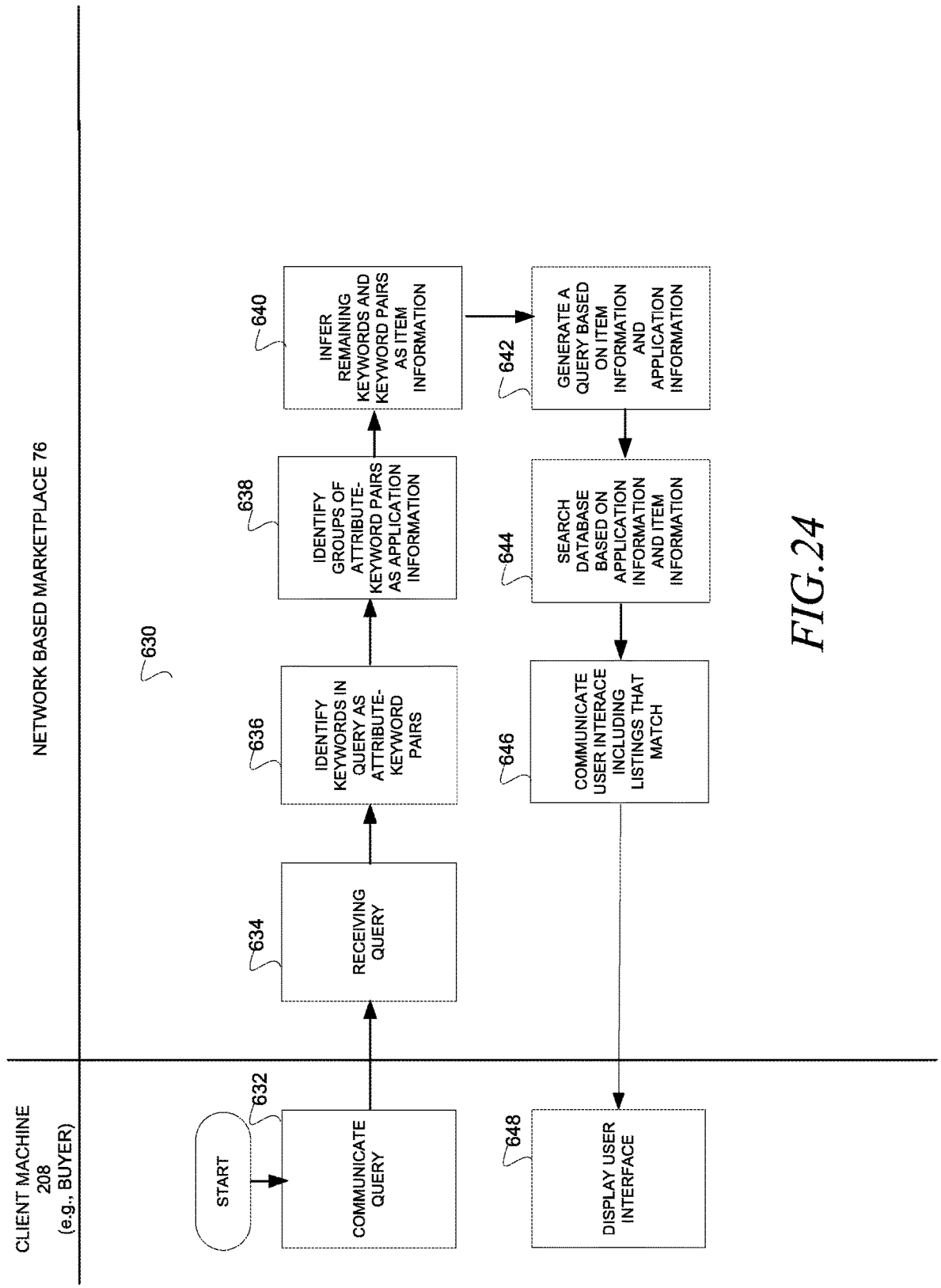
FIG. 24 is a flow chart illustrating a method to search a data source based on a compatibility with an application, according to an embodiment.

FIG. 24 is a flow chart illustrating a method 630, according to an embodiment, to search a data source (e.g., database 224) based on a compatibility with an application. Operations on the left are performed by a client machine 208 and operations on the right are performed by a network-based marketplace 76. The method 630 commences at operation 632 with the client machine 208 communicating a first query in the form of a query to the network-based marketplace 76. The query may include one or more keywords. At operation 634, the finding module 268 may receive the query. For example, the query may include the keywords "Honda civic brake pad cheap."

At operations 636 and 638, the finding module 268 may identify at least one keyword in the query as application information describing a first application. At operation 636, the finding module 268 may invoke the keyword converter module 266 to identify attribute-keyword pairs 514 in the query. For example, the finding module 268 may communicate the keywords 512 in the query to the keyword converter module 266 that, in turn, converts "Honda civic brake pad" to the following attribute-keywords pairs 514 including "MAKE=HONDA, MODEL=CIVIC," "PART_TYPE=break pad" leaving "cheap" unconverted.

At operation 638, the finding module 268 may invoke the metadata module 264 to identify groups of attribute-keyword pairs 514 as application information identifying a first application (e.g., vehicle) for which the "break pad" is compatible or fits. For example, the metadata module 264 may identify the attribute-keyword pairs 514 "MAKE=HONDA, MODEL=CIVIC" as a group of application information describing the first application.

At operation 640, the finding module 268 may infer item information. For example, the finding module 268 may infer that keywords 512 not converted to attribute keyword-pairs 514 are item information. Recall that item information describes the item that is being searched for by the buyer. In addition, the finding module 268 may infer the attribute-keyword pairs 514 not identified as application information are item information for further describing the sought after item.

At operation 642 the finding module 268 may generate a query based on the item information and the application information. For example, the finding module may generate the following query:

```
(("MAKE=HONDA and MODEL=CIVIC") OR ("Honda" AND "Civic"))
AND "PART TYPE = break pad" AND
"cheap."
```

The above query may be rewritten as the following two queries:

| Query | Operators and Operands | Compared with . . . |
|---|---|---|
| Q1 | "MAKE=HONDA AND MODEL=CIVIC," AND | listing application information 81 |
|  | "PART_TYPE = break pad" AND "cheap" | listing item information 80 |
| Q2 | "Honda" AND "Civic" AND "PART_TYPE = break pad" AND "cheap" | listing item information 80 |

In Q1, the operands "MAKE=HONDA AND MODEL=CIVIC," are compared with listing application information 81 in the respective listings 78 in the items table 307, and the operands "PART_TYPE=break pad" AND "cheap" are compared with listing item information 80 in the respective listings 78 in the items table 307. Accordingly, a match is identified in both the listing application information 81 and the listing item information 80.

In Q2, all of the operands are applied to the listing item information 80 in the listings 78. Accordingly, Q2 comparisons are performed only in the listing item information 80 to identify whether a listing 78 matches.

It will be appreciated that the application information identified in the query, "MAKE=HONDA AND MODEL=CIVIC," may be applied against each of the application identifiers 505 in a particular listing 78. Accordingly, a match with any one of the application identifiers 505 in the listing 78 constitutes a match for that listing 78.

Further, it will be appreciated the keyword 512 "Honda" from the attribute-keyword pair 514 is compared with a value that corresponds to the MAKE attribute in the attribute-value pair 580 in the application identifier 505 in the listing application information 81 in the listing 78. In like manner, the keyword 512 "Accord" from the attribute-keyword pair 514 is compared with the value that corresponds to the MODEL attribute in the attribute-value pair 580 in the application identifier 505 in the listing application information 81 in the listing 78.

At operation 644, the finding module 268 may invoke a search module 261 to search the data source (e.g., database 224) based on the above described constructed query and return search results. At operation 646, the finding module 268 may communicate a user interface to the buyer including search results which include the matched listings.

Figure 25:
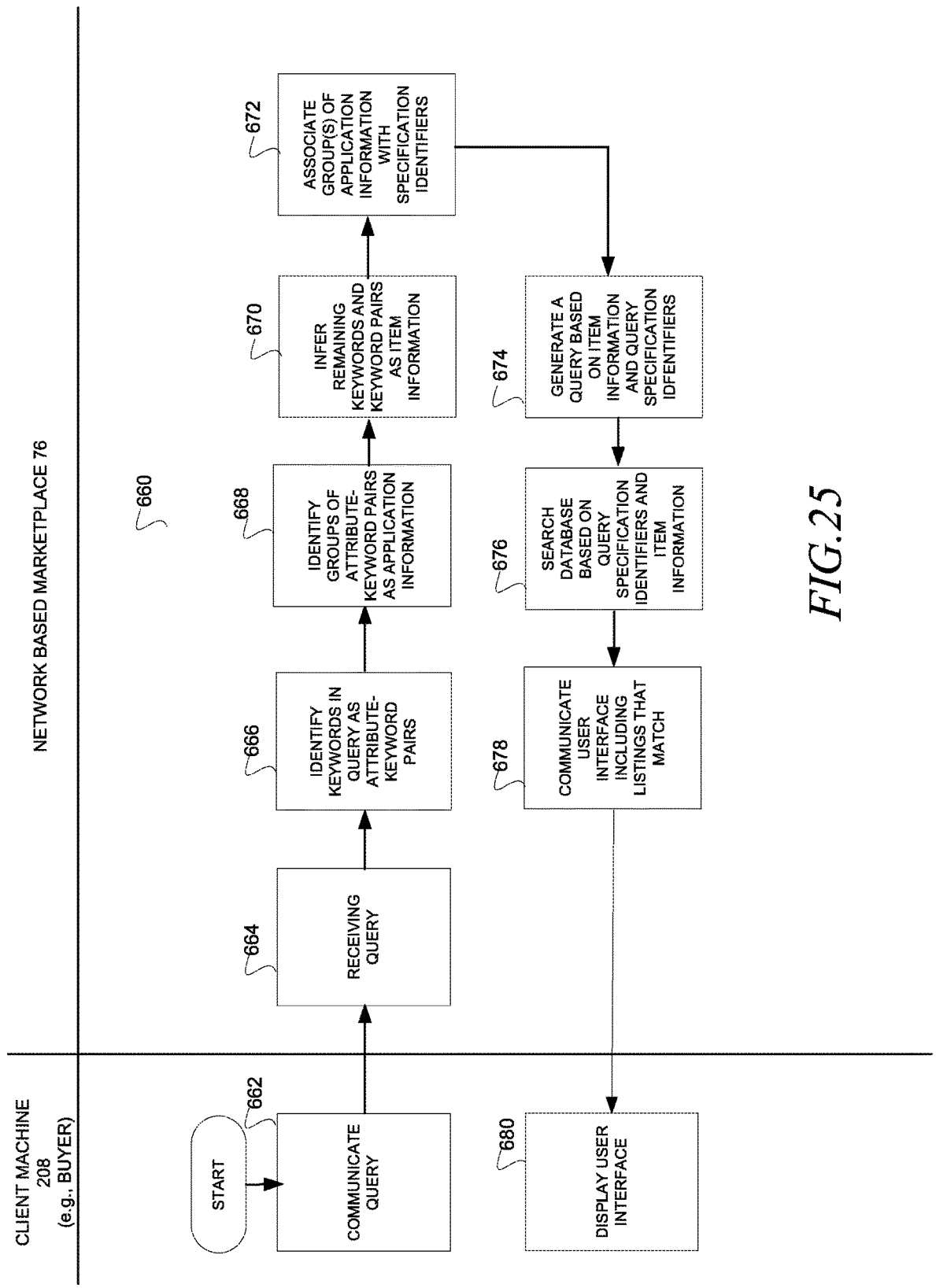
FIG. 25 is a flow chart illustrating a method to search a data source based on a compatibility via a specification, according to an embodiment.

FIG. 25 is a flow chart illustrating a method 660, according to an embodiment, to search a data source based on compatibility via a specification. Operations on the left are performed by a client machine 208 and operations on the right are performed by a network-based marketplace 76. The method 660 commences at operation 662 with the client machine 208 communicating a first query in the form of a query to the network-based marketplace 76. The query may include one or more keywords 512.

At operation 664, the finding module 268 may receive the query. For example, the query may again include the keywords 512 "Honda civic brake pad cheap." At operation 666, the finding module 268 may invoke the keyword converter module 266 to identify attribute-keyword pairs 514 in the query. For example, the finding module 268 may communicate the keywords 512 in the query to the keyword converter module 266 that, in turn, converts "Honda civic brake pad" to the following attribute-keywords pairs 514 including "MAKE=HONDA, MODEL=CIVIC," "PART_TYPE=break pad" leaving "cheap" unconverted.

At operations 668 and 670, the finding module 268 may identify at least one keyword 512 in the query as application information describing a first application. At operation 668, the finding module 268 may invoke the metadata module 264 to identify groups of attribute-keyword pairs 514 as application information identifying a first application (e.g., vehicle) for which the "break pad" is compatible or fits. For example, the metadata module 264 may identify the attribute-keyword pairs 514 "MAKE=HONDA, MODEL=CIVIC" as a group of application information describing the first application.

At operation 670, the finding module 268 may infer item information. For example, the finding module 268 may infer that keywords 512 not converted to attribute keyword-pairs 514 are item information. Recall that item information may describe the item that is being searched for by the buyer. In addition, the finding module 268 may infer the attribute-keyword pairs 514 not identified as application information are item information for describing the sought after item.

At operation 672, the catalogue module 252 may associate groups of application information with product specification information 160. For example, the finding module 268 may communicate the application information "MAKE=HONDA, MODEL=CIVIC" to the catalogue module 252 and request the catalogue module 252 to return all specification identifiers 592 that are compatible with the application information "MAKE=HONDA, MODEL=CIVIC." In response to receiving the request, the catalogue module 252 may access the catalogue information 470 (e.g., catalogue for vehicles) in the database 224 to identify matching product item information 500 based on the application information "MAKE=HONDA, MODEL=CIVIC" and to return the associated product specification information 160 including specification identifiers 592. For example, the specifications returned may include specification identifiers 592 for tires (e.g., SECTION_WIDTH=195, ASPECT_RATIO=65, DIAMETER=R15, LOAD_INDEX=91, SPEED INDEX=H), rims, engine, electronics, or any other specification associated based on products that include product item information 500 that matches "MAKE=HONDA, MODEL=CIVIC."

At operation 674 the finding module 268 may generate a query based on the item information and the product specification identifiers 592. For example, the finding module 268 may generate the following query, where $S_x$=a specification identifier 592.

---

(("$S_1$, OR $S_2$, OR $S_3$, OR $S_4$ OR...$S_N$, ") OR ("Honda" AND "Civic"))
AND "PART_TYPE = break pad" AND
"cheap."

---

The above query may be rewritten as the following two queries:

| Query | Operators and Operands | Compared with . . . |
|---|---|---|
| Q1 | ("$S_1$,OR $S_2$,OR $S_3$,OR $S_4$ OR . . . $S_N$,") | listing specification information 82 |
|  | AND |  |
|  | "PART_TYPE = break pad" AND "cheap" | listing item information 80 |
| Q2 | "Honda" AND "Civic" AND | listing item information 80 |
|  | "PART_TYPE = break pad" AND "cheap" |  |

In Q1, the specification identifiers 592 in the form of operands $S_1$, OR $S_2$, OR $S_3$, OR $S_4$ OR . . . $S_N$, are compared with the listing specification information 82 in the respective listings 78 in the items table 307, and the operands "PART_TYPE=break pad" AND "cheap" are compared with listing item information 80 in the respective listings 78 in the items table 307. Accordingly, a match is identified in both the listing specification information 82 and the listing item information 80.

In Q2, all of the operands are compared with the listing item information 542 to identify whether a listing 78 matches.

It will be appreciated that each of the specification identifiers 592 in the form of the operands $S_1$, OR $S_2$, OR $S_3$, OR $S_4$ OR . . . $S_N$, may be compared with each of the specification identifiers 592 in the respective listings 78 in the items table 307. Accordingly, a match between any one of the specification identifiers 592 identified via the query and any one of the specification identifiers 560 in a particular listing 78 constitutes a match for that listing 78.

Further, it will be appreciated that the specification identifier 592 in the form of an operand (e.g., $S_1$) may include attribute-value pairs 580 that respectively include values and that each of the values are compared with corresponding values in attribute-value pairs 580 in the specification identifiers 560 in the listing specification information 82.

At operation 676, the finding module 268 may invoke a search module 261 to search the data source in the form of a database 224 based on the above described query(s) to identify and return matched listings 78, as described above. At operation 678, the finding module 268 may communicate a user interface to the buyer including the search results including the matched listings.

Figure 26:
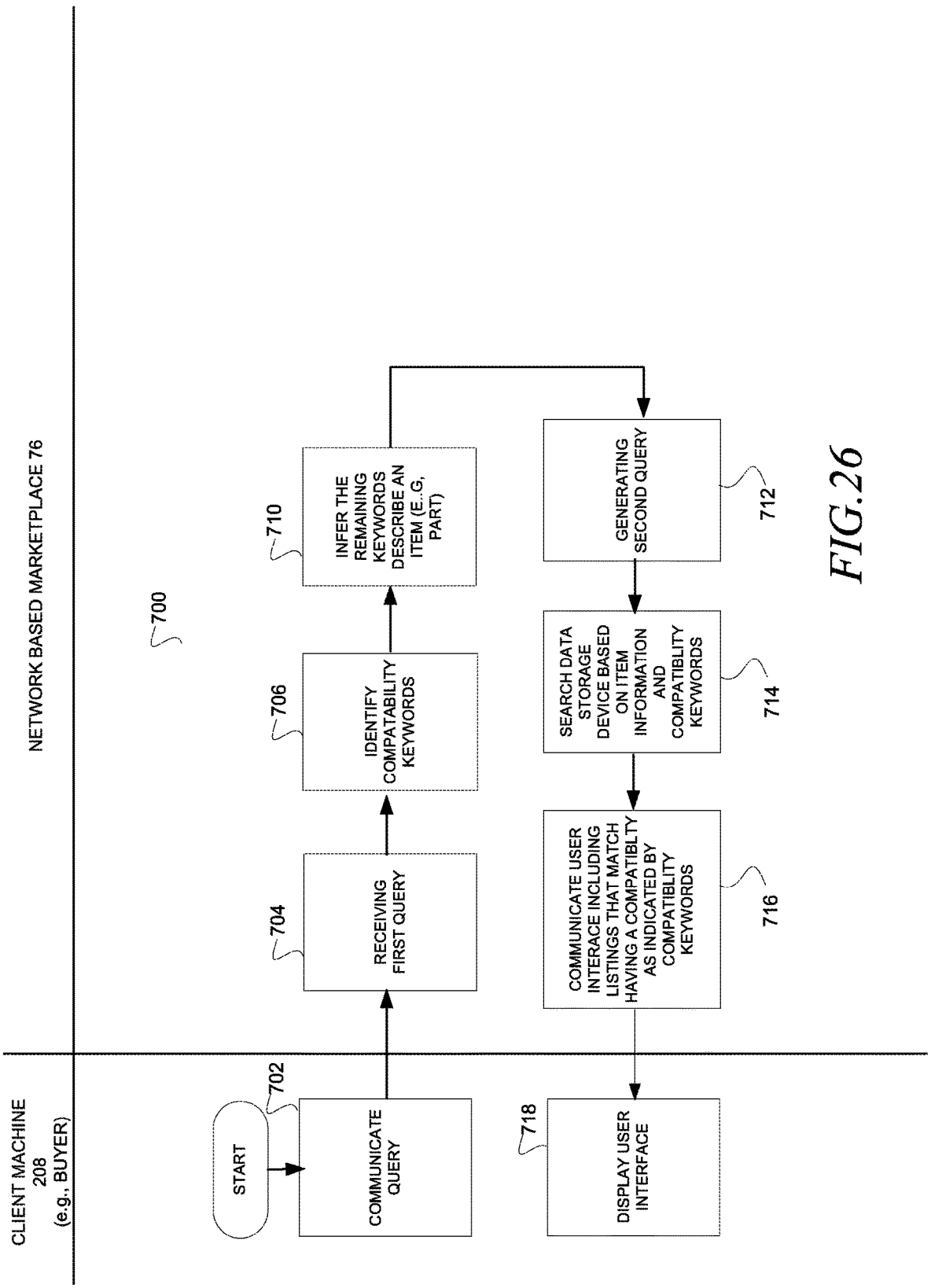
FIG. 26 is a flow chart illustrating a method to supplement search results returned to a buyer of parts, according to an embodiment.

FIG. 26 is a flow chart illustrating a method 700 to supplement search results returned to a buyer of parts, according to an embodiment. Operations on the left are performed by a client machine 208 and operations on the right are performed by a network-based marketplace 76. The method 700 commences at operation 702 with the client machine 208 communicating a first query to the network-based marketplace 76. The query may include one or more keywords 512 describing an item (e.g., part) that is sought after by a buyer, describing a specification for the item, or describing an application for which the item may fit. For example, the query may include the following keywords 512: "USB male 2.0 mouse lenovo laptop."

At operation 704, at the network-based marketplace 76, the finding module 268 may receive the query. At operation 706, the finding module 268 may identify compatibility keywords in the query. For example, the finding module 268 may identify one or more keywords 512 in the query as specification information that identifies a specification (e.g., "USB male 2.0"). Further, for example, the finding module 268 may identify one or more keywords 512 in the query as application information that identifies an application that is compatible with the sought after part (e.g., "lenovo laptop").

At operation 710, the finding module 268 infers that the remaining keywords 512 in the query describe the item (e.g., "mouse"). At operation 712, the finding module 268 may generate a second query based on the query received, the specification information, and the application information. For example, the query may appears as follows:

---

((SPECIFICATION=USB, INTERFACE=MALE, VERSION=2.0) OR
("USB AND "male" AND 2.0")
AND
((Expansion of "Lenovo AND Laptop" (e.g., attribute-value pairs) OR
("Lenovo AND Laptop"))
AND
"mouse."

---

The above query may be rewritten as the following four queries:

| Query | Operators and Operands | Compared with . . . |
|---|---|---|
| Q1 | "USB male 2.0 mouse" | listing item information 80 |

-continued

| Query | Operators and Operands | Compared with ... |
|---|---|---|
| | AND | |
| | Application identifiers 505 for "MAKE=LENOVO," "STYLE=LAPTOP" | listing application information 81 |
| Q2 | SPECIFICATION=USB, INTERFACE=MALE, VERSION=2.0 | listing specification information 82 |
| | AND | |
| | "mouse" | listing item information 80 |
| | AND | |
| | Application identifiers 505 for "MAKE=LENOVO," "STYLE=LAPTOP" | listing application information 81 |
| Q3 | SPECIFICATION=USB, INTERFACE=MALE, VERSION=2.0 | listing specification information 82 |
| | AND | |
| | "mouse lenovo laptop" | listing item information 80 |
| Q4 | "USB male 2.0 mouse lenovo laptop" | listing item information 80 |

At operation 714, the finding module 268 may invoke a search module 261 to search the data source in the form of a database 224 based on the above described queries to identify and return matched listings 78, as described above. If Q1, or Q2 or Q3 or Q4 is identified TRUE, then the listing 78 may be identified as matched. If the listing 78 is matched based on the application information 158 in the query matching the listing application information 81 in the listing 78 (e.g., Q1), then the presentation of the item in the search results may be supplemented with the compatibility keywords in the query that correspond to the application information (e.g., "lenovo laptop"). For example, the listing 78 in the search results may be supplemented as follows: "For: Lenovo laptop." If a listing 78 is matched based on the specification information 160 in the query matching the listing specification information 82 in the listing 78 (e.g., Q3), then the presentation of the item in the search results may be supplemented with the compatibility keywords in the query that correspond to the specification information (e.g., USB male 2.0"). For example, a listing 78 in the search results may be supplemented as follows: "Specification: USB male 2.0." If the listing 78 is matched based on the specification information 160 in the query matching the listing specification information 82 in the listing 78 and the application information 158 in the query matching the listing application information 81 in the listing 78 (e.g., Q2), then the presentation of the item in the search results may be supplemented with the compatibility keywords in the query that correspond to the specification information (e.g., USB male 2.0"). Specifically, the specification information may override the application information for the purpose of presenting supplementation with compatibility keywords. For example, the listing 78 in the search results may be supplemented as follows: "Specification: USB male 2.0."

At operation 714, the search module 261 may further utilize the above queries to identify under-matched listings 78. An under-matched listing 78 may be considered a type of matched listing 78. The under-matched listing 78 may be identified when a buyer enters a query with less information than is present in a listing 78. Consider the example below:

| Query | Listing 78 |
|---|---|
| (application information 158) | (listing application information 81) |
| MAKE=HONDA, MODEL=ACCORD | MAKE=HONDA, MODEL=ACCORD, YEAR=2002, TRIM=LX, ENG=1.7 |

The above example, includes a query with application information 81 in the form of the attribute-value pairs 580 MAKE=HONDA, MODEL=ACCORD and a listing 78 with listing application information 81 in the form of the attribute-value pairs MAKE=HONDA, MODEL=ACCORD, YEAR=2002, TRIM=LX, ENG=1.7. The search module 261 may compare the attribute value pairs 580 in the application information (e.g., MAKE=HONDA, MODEL=ACCORD) with corresponding attribute-value pairs 580 (e.g., MAKE=HONDA, MODEL=ACCORD) in the listing application information 81 to identify a match. Nevertheless, the search module 261 may further identify the listing application information 81 as including at least one additional attribute-value pair 580 that is not present in the application information 158 (e.g., YEAR=2004, TRIM=LX, ENG=1.7). Accordingly, the search module 261 may identify the above match as an under-match. In like manner, the search module 261 may identify an under-match by comparing specification information 160 received in a query with listing specification information 82 stored in a listing 78.

At operation 716, the finding module 268 may communicate a user interface to the buyer including the search results, which includes the matched listing 78 supplemented with compatibility keywords as described above and/or under-matched listings as described above.

Figure 27:
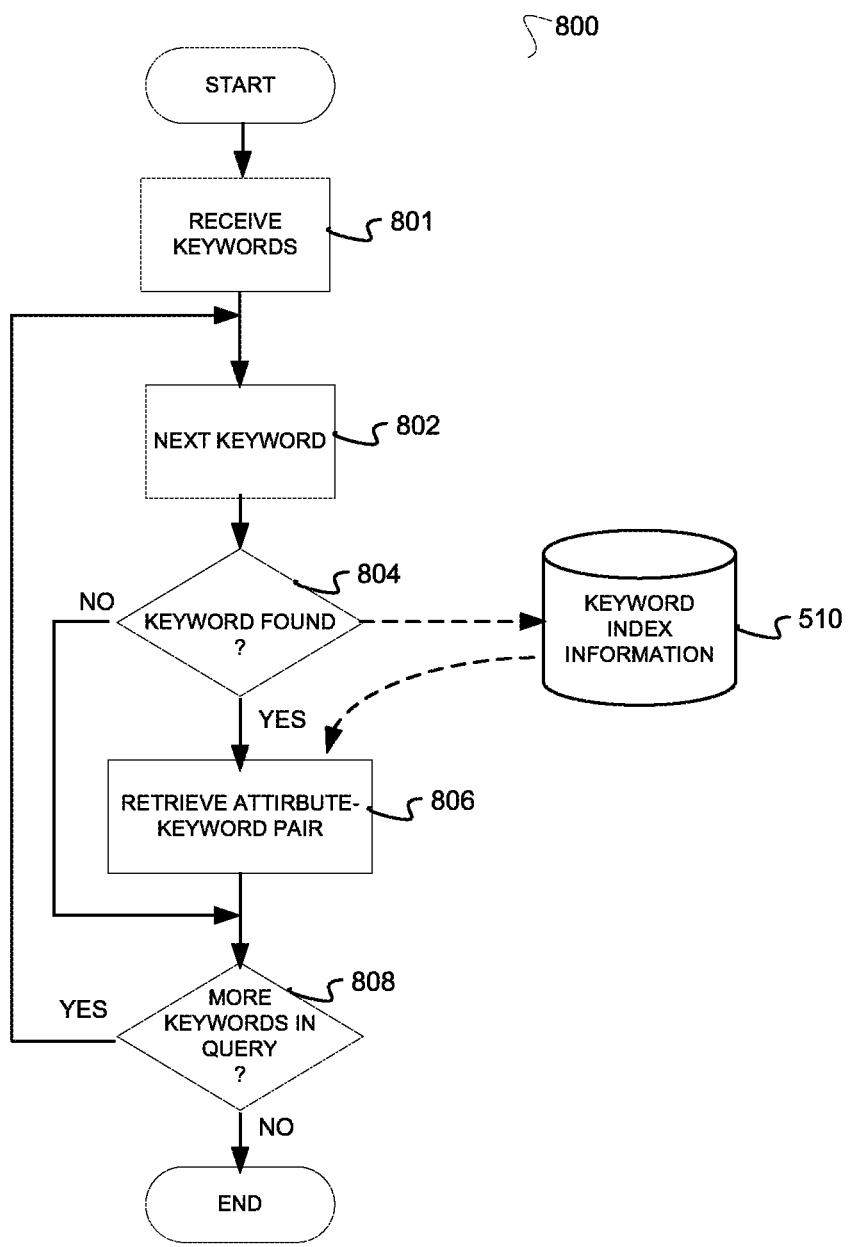
FIG. 27 is a flow chart illustrating a method to associate keywords to attribute-keyword pairs, according to an embodiment.

FIG. 27 is a flow chart illustrating a method 800, according to an embodiment, to associate keywords 512 to attribute-keyword pairs 514. The method 800 corresponds to the operation 636 in FIG. 24, operation 666 in FIG. 25, and operation 854 in FIG. 29. The method 800 commences at operation 801 with the keyword converter module 266 receiving keywords from the finding module 268. For example, the keywords may have been received by the finding module 268 in a query from a seller. At operation 802, the keyword converter module 266 may advance to the next keyword in the query. At decision operation 804, the keyword converter module 266 may access the keyword index information 510 to identify whether the keyword from the query matches a keyword in the keyword index information 510. If a match is identified, a branch is made to operation 806. Otherwise a branch is made to decision operation 808. At operation 806, the keyword converter module 266 may retrieve the attribute-keyword-pair 514 corresponding to the match. For example, the keyword "Honda" may match, and the corresponding keyword-pair may be MAKE=HONDA. At decision operation 808, the keyword converter module 266 may identify whether more keywords need to be processed. If more keywords need to be processed a branch is made to operation 802. Otherwise the process ends.

Figure 28:
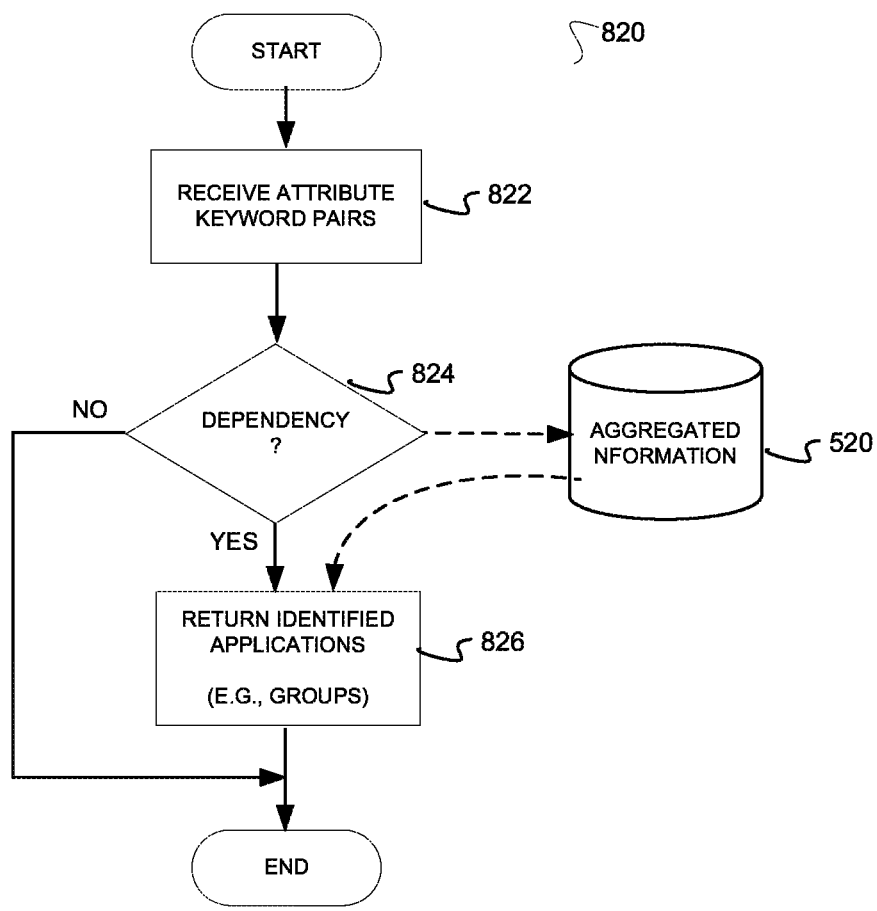
FIG. 28 is a flow chart illustrating a method, according to an embodiment, to identify groups of attribute-keyword as application information.

FIG. 28 is a flow chart illustrating a method 820, according to an embodiment, to identify groups of attribute-keyword pairs 514 as application information. The method 820 corresponds to the operation 638 in FIG. 24, operation 668 in FIG. 25, and operation 856 in FIG. 29. The method 820 commences at operation 822 with the metadata module 264 receiving attribute-keyword pairs 514 from the finding module 268. For example, the attribute-keyword pairs 514 may have been identified based on the keywords in a query and include MAKE=HONDA, MODEL=ACCORD, MAKE=FORD, MODEL=TAURUS, and PART_TYPE=ALTERNATOR. At decision operation 824, the metadata module 264 may access the aggregated information 520 to identify whether any of the attribute-keyword pairs 514 are identified as a single group constituting an application. For example, the metadata module 264 may identify groups of attribute-keyword pairs 514 based on dependencies between attribute-keyword pairs 514 in the aggregated information 520. For example, the metadata module 264 may identify two applications including application 1—(MAKE=HONDA, MODEL=ACCORD) and application 2—(MAKE=FORD, MODEL=TAURUS). If any of the attribute-keyword pairs 514 are identified as a single group then a branch is made to operation 826. Otherwise the process ends. At operation 826, the metadata module 264 returns the identified groups of attribute-keyword pairs 514 as application information describing applications to the finding module 268, and the process ends.

Figure 29:
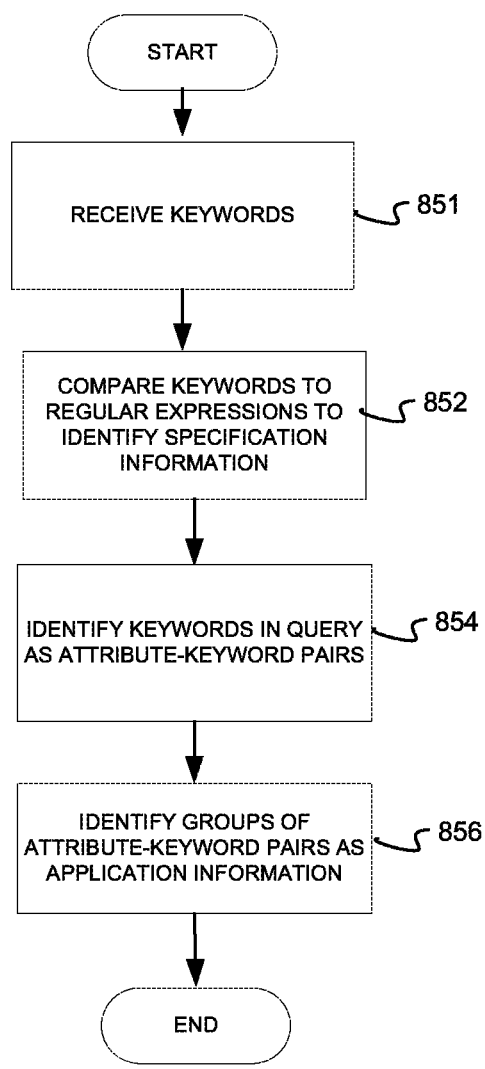
FIG. 29 is a flow chart illustrating a method to identify compatibility keywords, according to an embodiment.

FIG. 29 is a flow chart illustrating a method 850, according to an embodiment, to identify compatibility keywords. The method 850 commences at operation 851 with the finding module 268 receiving the keywords in a query as entered by a buyer. At operation 852, the finding module 268 compares the keywords to one or more regular expressions to identify whether the keywords include specification information describing a specification. A regular expression provides a means for identifying segments of text of interest, such as particular characters, words, or patterns of characters. The regular expression (e.g., regex or regexp) may be written in a formal programming language that may be interpreted by a regular expression processor, a program that either serves as a parser generator or examines text and identifies parts that match the provided specification.

The regular expressions may include multiple expressions that respectively identify an allowable range of expression. For example, the following regular expression may be used to identify whether the query includes keywords that may be identified as specification information for a widget:
P([123][0-9][05])/([0-9][05])R([12][0-9])
The above regular expression may restrain a query to include the letter "P" followed by a valid range of numbers determined by "[123][0-9][05]" followed by a valid range of numbers determined by . . . "[0-9][05]" . . . followed by the string "R" followed by a valid range of numbers determined by "[12][0-9]". The brackets (e.g., [ ]) may define the characters that are valid in the designated position. An enumeration of characters may define a valid set, so "[123]" means that the characters '1', '2', or '3' are required to define a match in the pattern at that character. The hyphen may define a range of characters that are valid in that character position, for example "[0-9]" indicates that any numerical character between 0 and 9 is valid. When these are combined as follows, "[123][0-9][05]" the matching criteria express a constraint on the pattern such that only a 3 character sequence of numbers, starting with a first value (hundreds digit) of '1', '2', or 3, followed by any number in the second value (tens digit), followed by either a '0' or a '5' (ones digit), constitute a match. The consequence is that the pattern can successfully identify all numbers between 100 and 395 which are a multiple of 5. This kind of numeric pattern is common in specifications, such as tire and rim sizes. Further it will be appreciated that the parenthesis identifies groups of library routines which may be associated with aspects of a specification. For example, the first parenthesis group, "([123][0-9][05])" may identify a SECTION_WIDTH, the second group may identify an ASPECT_RATIO, and the third group may identify a RIM_DIAMETER. Additional business logic may be applied to insure valid combinations of values have been extracted from these groups to minimize further processing of irrational combinations.

At operation 854, the finding module 268 invokes the keyword converter module 266 to convert the keywords in the query to attribute-keyword pairs 514 as described in FIG. 27. At operation 856, the finding module 268 invokes the metadata module 264 to identify attribute-keyword pairs 514 as application information as described in FIG. 28.

FIG. 30 is a diagram illustrating a user interface 860, according to an embodiment, to receive application information (e.g., user interface to manually configure a compatibility with an application). The user interface 860 is shown to include a predetermined set of attributes 862 including "Model Year", "Make", "Model", "Trim", and "Engine." Each of the predetermined set of attributes 862 may be configured by the user (e.g., seller). For example, the user may select a value 864 for each of the corresponding attributes by utilizing a pull down menu 866. In the present example the user has selected the values "Honda" and "Accord." The user interface 860 further includes application identifiers 505 as retrieved from product application information 501 in the product information 472 based on the values "Honda" and "Accord" that were received from the user. Specifically, each of the illustrated application identifiers 505 were retrieved from product application information 501 based on the matching values "Honda" and "Accord." Responsive to the user selecting a user interface element 868, the network-based marketplace 76 may store the retrieved application identifiers 505 as listing application information 81 in the listing 78. The user interface 860 further includes a user interface element 869 that may be selected by the user to enable the network-based marketplace 76 to receive note information 590 from the user. For example, the note information 590 may include one or more attribute-value pairs 580 or alphanumeric text describing further features related to compatibility, as previously described.

It will be appreciated that the user may manually configure a compatibility with an application by selecting additional or fewer values. For example, the user may select the values "Honda" and "Accord" and a model year "2002." Also for example, the user may merely select the value "Honda."

FIG. 31 is a diagram illustrating a user interface 870, according to an embodiment, to find a product (e.g., product finder). The user interface 870 is shown to include attributes 872 including "Manufacturer", "Rim Diameter", "Number of Bolts", "Rims Width", "Bolt Patterns", and "Offset." The user interface 870 is shown to include a pull down menu 876 that may be utilized by the user to select a value 874 for the corresponding attribute 872.

Figure 32:

FIG. 32 is a diagram illustrating a user interface 880, according to an embodiment, to view an item (e.g., view item). The user interface 880 is shown to illustrate a presentation of an item or part (e.g., rims) that is supplemented with compatibility keywords 882 from a query. The compatibility keywords 882 include application information to describe an application, namely, "2004 Honda Civic Si."

Figure 33A:

FIG. 33A is a diagram illustrating a user interface 890, according to an embodiment, illustrating a listing 892 and a listing 893. The listing 892 illustrates a presentation of an item or part (e.g., Goodyear Eagle F1 tire) that is supplemented with compatibility keywords from a query. The compatibility keywords include specification information 160 to describe a specification for the tire, namely, "275/45ZR20." The listing 893 illustrates a presentation of an item or part (e.g., Honda Civic Brake Pads) that is supplemented with compatibility keywords from a query. The compatibility keywords include application information 158 to describe an application, namely, "2008 Honda Civic."

Figure 33B:

FIG. 33B is a diagram illustrating a user interface 894, according to an embodiment, illustrating a listing 896 and a listing 897. The listing 896 illustrates a presentation of an item or part (e.g., Goodyear Eagle F1 tire) that is possibly compatible with a specification and supplemented with compatibility keywords from a query. The listing 896 is illustrated as possibly compatible with a user interface element 898 in the form of a string, "might fit." The compatibility keywords include specification information 160 to describe a specification for the tire, namely, "275/45ZR20." The listing 893 illustrates a presentation of an item or part (e.g., Honda Civic Brake Pads) that is possibly compatible with an application and supplemented with compatibility keywords from a query. The listing 896 is illustrated as possibly compatible with a user interface element 899 in the form of a string, "might fit." The compatibility keywords include application information 160 to describe an application, namely, "2008 Honda Civic."

The above-described user interfaces are illustrated to include user interface elements and columns for display. However, it will be appreciated by those skilled in the art that the user interfaces may also be embodied as a machine interface (e.g., Standard Generalized Markup Language—SGML) including machine interface elements, an audio interface including audio interface elements, and a kinetic interface including kinetic interface elements.

In some embodiments, the methods described herein may be implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level and communicates the results of these logical/mathematical manipulations to the interface tier and/or to a backend, or storage, tier. These logical/mathematical manipulations may relate to certain business rules or processes that govern the software application as a whole. A third, storage, tier may be a persistent storage medium or non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer-to-peer, or so some other suitable configuration. Further, these three tiers may be distributed between multiple computer systems as various software components.

Some example embodiments may include the above illustrated tiers, and processes or operations that make them up, as being written as one or more software components.

Common to many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various APIs, and then compiled into one complete server, client, and/or peer software application. Further, these APIs may be able to communicate through various distributed programming protocols as distributed computing components.

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, a component written in C++ may be able to communicate with another component written in the Java programming language by using a distributed computing protocol such as a Common Object Request Broker Architecture (CORBA), a Simple Object Access Protocol (SOAP), or some other suitable protocol. Some embodiments may include the use of one or more of these protocols with the various protocols outlined in the Open Systems Interconnection (OSI) model, or Transport Control Protocol/Internet Protocol (TCP/IP) protocol stack model for defining the protocols used by a network to transmit data.

Some embodiments may utilize the OSI model or TCP/IP protocol stack model for defining the protocols used by a network to transmit data. In applying these models, a system of data transmission between a server and client, or between peer computer systems, is illustrated as a series of roughly five layers comprising: an application layer, a transport layer, a network layer, a data link layer, and a physical layer. In the case of software having a three-tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), WAN, or some other suitable network. In some cases, "internet" refers to a network of networks. These networks may use a variety of protocols for the exchange of data, including the aforementioned TCP/IP, and additionally asynchronous transfer mode (ATM), system network architecture (SNA), SDI, or some other suitable protocol. These networks may be organized within a variety of topologies (e.g., a star topology) or structures.

Figure 34:
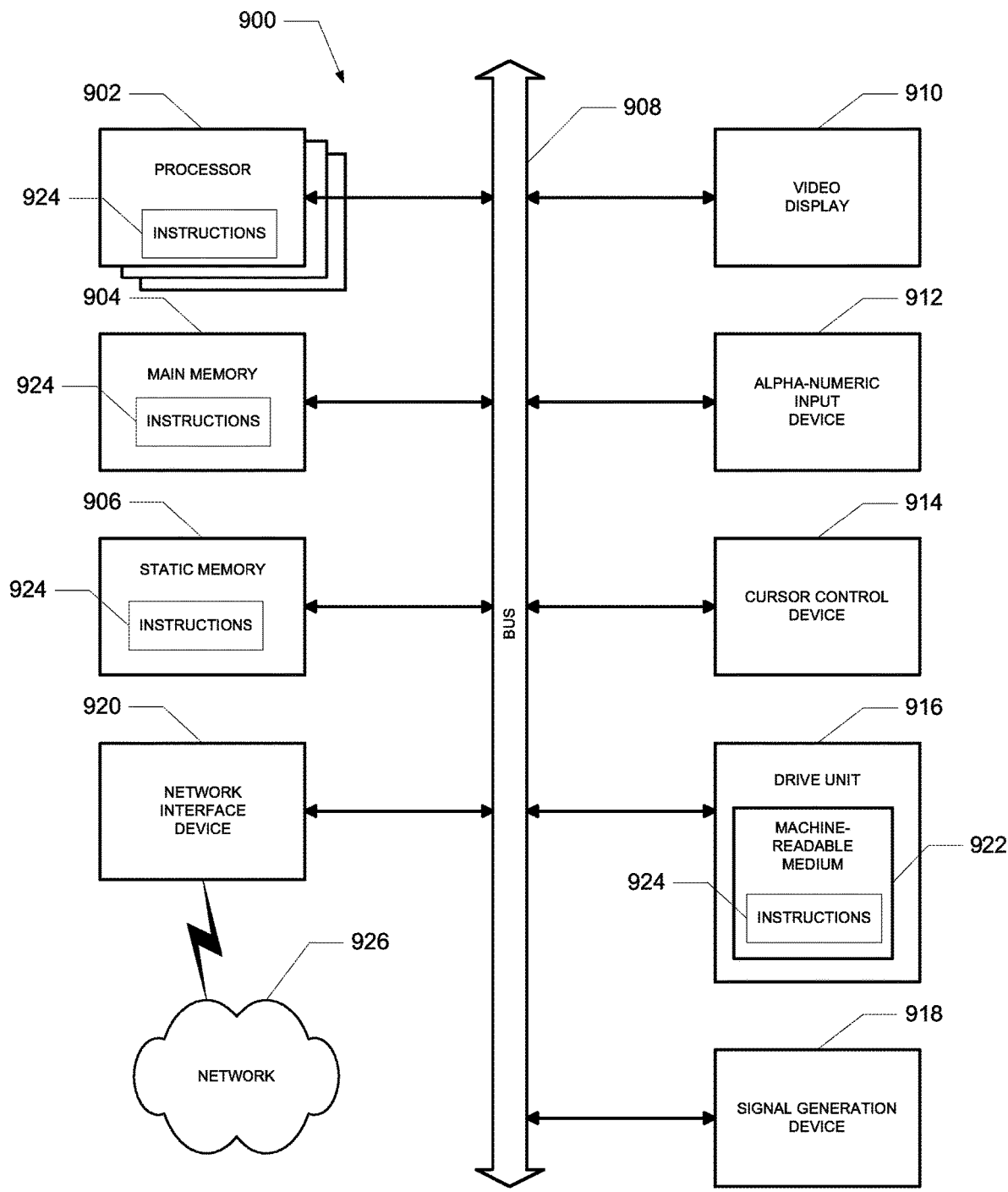
FIG. 34 shows a diagrammatic representation of a machine in the example form of a computer system, according to an example embodiment.

FIG. 34 shows a diagrammatic representation of a machine in the example form of a computer system 900 within which a set of instructions may be executed for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in client-server network environment, or as a peer machine in a peer-to-peer (or distributed) network environment. The machine may be a server computer, a client computer, a personal computer (PC), a tablet PC, a set-top box (STB), a PDA, a cellular telephone, a web appliance, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes one or more processors 902 (e.g., a central processing unit (CPU), a graphics processing unit (GPU), or both), a main memory 904 and a static memory 906, which communicate with each other via a bus 908. The computer system 900 may further include a video display unit 910 (e.g. a liquid crystal display (LCD) or a cathode ray tube (CRT)). The computer system 900 also includes an input device 912 (e.g., a keyboard), a cursor control device 914 (e.g., a mouse), a disk drive unit 916, a signal generation device 918 (e.g., a speaker) and a network interface device 920.

The disk drive unit 916 includes a machine-readable medium 922 on which is stored one or more sets of instructions (e.g., software) 924 embodying any one or more of the methodologies or functions described herein. The instructions 924 may also reside, completely or at least partially, within the main memory 904, the static memory 906, and/or within the processor 902 during execution thereof by the computer system 900. The main memory 904 and the processor 902 also may constitute machine-readable media. The instructions 924 may further be transmitted or received over a network 926 via the network interface device 920.

Software applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations. In example embodiments, a computer system (e.g., a standalone, client or server computer system) configured by an application may constitute a "module" that is configured and operates to perform certain operations as described herein. In other embodiments, the "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g. configured by software) may be driven by cost and time considerations. Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein.

While the machine-readable medium 922 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present description. The term "machine-readable medium" shall accordingly be taken to include, but not be limited to, solid-state memories, optical media and magnetic media. As noted, the software may be transmitted over a network using a transmission medium. The term "transmission medium" shall be taken to include any medium that is capable of storing, encoding or carrying instructions for transmission to and execution by the machine, and includes digital or analogue communications signal or other intangible medium to facilitate transmission and communication of such software.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of ordinary skill in the art upon reviewing the above description. Other embodiments may be utilized and derived therefrom, such that structural and logical substitutions and changes may be made without departing from the scope of this disclosure. The figures provided herein are merely representational and may not be drawn to scale. Certain proportions thereof may be exaggerated, while others may be minimized. Accordingly, the specification and drawings are to be regarded in an illustrative rather than a restrictive sense.

Thus, methods and systems are disclosed to supplement search results returned to a buyer of parts. While the present disclosure has been described in terms of several example embodiments, those of ordinary skill in the art will recognize that the present disclosure is not limited to the embodiments described, but may be practiced with modification and alteration within the spirit and scope of the appended claims. The description herein is thus to be regarded as illustrative instead of limiting.

What is claimed:
1. A system comprising:
 at least one processor and executable instructions accessible on a computer-readable medium that, when executed, cause the at least one processor to perform operations comprising:

receiving a first query, over a network and at a network-based marketplace, from a first client machine, the first query including a plurality of keywords;

identifying at least one compatibility keyword included in the plurality of keywords, the identifying the at least one compatibility keyword being based on compatibility services being periodically updated in real time;

identifying at least one keyword in the first query as application information describing a first application;

identifying at least one keyword in the first query as specification information describing a first specification;

inferring other keywords in the first query as item information describing a part that is sought for on a network-based marketplace, the part being associated with an identified compatibility based on the at least one compatibility keyword;

searching the data storage device based on the item information and the at least one compatibility keyword, the application information, or the specification information to identify at least one listing on the network-based marketplace as matched, the at least one listing including a first listing; and communicating via the network-based marketplace and over a network, a first user interface, the first user interface presenting the first listing describing the matched part, the matched part having identified compatibility as indicated by supplementing the presentation of the first listing with the at least one compatibility keyword from the first query.

2. The system of claim 1, wherein the operations further comprise:
identifying the application information as under-matching the listing application information; and
presenting the part as possibly compatible with the first application based on the under-match.

3. The system of claim 1, wherein the operations further comprise:
identifying the specification information as under-matching the listing specification information; and
presenting the part as possibly compatible with the first specification based on the undermatch.

4. The system of claim 1, wherein the operations further comprise:
receiving catalogue information, at a network-based marketplace, from a catalogue vendor, the network-based marketplace supporting person-to-person trading and compatibility services that are periodically updated in real time; and
updating a catalogue table responsive to the receiving the catalogue information.

5. A machine-readable medium having no transitory signal and storing instructions that, when executed by at least one processor, cause the at least one processor to perform the actions comprising:
receiving a first query, over a network and at the network-based marketplace, from a first client machine, the first query including a plurality of keywords;
identifying at least one compatibility keyword included in the plurality of keywords, the identifying the at least one compatibility keyword being based on the compatibility services being periodically updated in real time;
inferring remaining keywords in the first query as item information describing a part that the buyer is searching for on a network-based marketplace, the part being associated with an identified compatibility based on the at least one compatibility keyword;

searching a data storage device based on the item information and the at least one compatibility keyword to identify at least one listing on the network-based marketplace as matched, the at least one listing including the first listing; and communicating via the network-based marketplace and over the network, a first user interface, the first user interface presenting the first listing describing the matched part, the matched part having identified compatibility as indicated by supplementing the presentation of the first listing with the at least one compatibility keyword from the first query.

6. The medium of claim 5, wherein the actions further comprise:
receiving catalogue information, at the network-based marketplace, from a catalogue vendor, the network-based marketplace supporting person-to-person trading and compatibility services that are periodically updated in real time; and
updating a catalogue table responsive to the receiving the catalogue information.

7. A method comprising:
receiving a first query, over a network at network-based marketplace supporting person-to-person trading and compatibility services, from a first client machine, the first query including a plurality of keywords;
identifying, using a data processor, at least one compatibility keyword included in the plurality of keywords, the identifying the at least one compatibility keyword being based on the compatibility services being periodically updated in real time:
inferring remaining keywords in the first query as item information describing a part that the buyer is searching for on the network-based marketplace, the part being associated with an identified compatibility based on the at least one compatibility keyword;
searching a data storage device based on the item information and the at least one compatibility keyword to identify at least one listing on the network-based marketplace as matched, the at least one listing including a first listing describing a matched part; and
communicating, via the network-based marketplace and over the network, a first user interface, the first user interface presenting the first listing describing the matched part, the matched part having an identified compatibility as indicated by supplementing the presentation of the first listing with the at least one compatibility keyword from the first query.

8. The method of claim 7, wherein the identifying at least one compatibility keyword includes identifying at least one keyword in the query as application information describing a first application.

9. The method of claim 8, wherein the listing includes listing application information and wherein the searching based on the item information and the at least one compatibility keyword to identify at least one listing on the network-based marketplace as matched comprises identifying the listing as matched based on a comparison of the application information with the listing application information.

10. The method of claim 9, wherein the presenting the first listing includes presenting the part as being compatible with the first application by presenting the at least one compatibility keyword from the first query with the first listing.

11. The method of claim 10, wherein the searching based on the item information and the at least one compatibility keyword to identify at least one listing on the network-based marketplace as matched comprises identifying the application information as under-matching the listing application information and wherein the presenting the first listing includes presenting the part as possibly compatible with the first application based on the under-matching.

12. The method of claim 7, wherein the identifying the at least one compatibility keyword comprises identifying at least one keyword in the query as specification information describing a first specification.

13. The method of claim 12, wherein the listing includes listing specification information and wherein the searching based on the item information and the at least one compatibility keyword to identify at least one listing on the network-based marketplace as matched comprises identifying the listing as matched based on a comparison of the specification information with the listing specification information.

14. The method of claim 13, wherein the presenting the first listing includes presenting the part as being compatible via a first specification by presenting the at least one compatibility keyword from the first query with the first listing.

15. The method of claim 14, wherein the searching based on the item information and the at least one compatibility keyword to identify at least one listing on the network-based marketplace as matched comprises identifying the specification information as under-matching the listing specification information and wherein the presenting the first listing includes presenting the part as possibly compatible via the first specification based on the undermatching.

16. The method of claim 7, wherein the identifying the at least one compatibility keyword includes identifying at least one keyword in the first query as specification information describing a first specification and at least one keyword in the first query as application information describing a first specification.

17. The method of claim 16, wherein the searching based on the item information and the at least one compatibility keyword to identify at least one listing on the network-based marketplace as matched includes identifying the listing as matched based on the specification information and the application information.

18. The method of claim 17, wherein the presenting the first listing includes presenting the part as being compatible via the first specification by presenting the at least one compatibility keyword from the first query with the first listing.

19. The method of claim 7, further comprising receiving catalogue information, at a network-based marketplace, from a catalogue vendor, the network-based marketplace supporting person-to-person trading and compatibility services that are periodically updated in real time.

20. The method of claim 19, further comprising updating a catalogue table responsive to receiving the catalogue information.

\* \* \* \* \*

UNITED STATES PATENT AND TRADEMARK OFFICE
CERTIFICATE OF CORRECTION

Page 1 of 1

PATENT NO. : 10,861,068 B2
APPLICATION NO. : 16/007763
DATED : December 8, 2020
INVENTOR(S) : Adam Bursey et al.

It is certified that error appears in the above-identified patent and that said Letters Patent is hereby corrected as shown below:

In the Claims

In Column 34, Line 31, in Claim 7, delete "time:" and insert -- time; --, therefor.

Signed and Sealed this
Eighth Day of February, 2022

Drew Hirshfeld
*Performing the Functions and Duties of the*
*Under Secretary of Commerce for Intellectual Property and*
*Director of the United States Patent and Trademark Office*